(12) United States Patent
Donovan et al.

(10) Patent No.: US 12,535,379 B2
(45) Date of Patent: Jan. 27, 2026

(54) SYSTEMS AND METHODS FOR DETECTING EMERGENCY CONDITIONS WITHIN A ROOFING STRUCTURE AND INITIATING REMEDIATION PROCEDURES

(71) Applicant: STATE FARM MUTUAL AUTOMOBILE INSURANCE COMPANY, Bloomington, IL (US)

(72) Inventors: John R. Donovan, Bloomington, IL (US); Joseph Robert Brannan, Bloomington, IL (US); Aaron Williams, Congerville, IL (US); Jeffrey W. Stoiber, Atlanta, GA (US); Bryan R. Nussbaum, Bloomington, IL (US); Ellakate LeFebre, Mesa, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 157 days.

(21) Appl. No.: 18/459,396

(22) Filed: Aug. 31, 2023

(65) Prior Publication Data
US 2024/0247998 A1   Jul. 25, 2024

Related U.S. Application Data

(60) Provisional application No. 63/440,562, filed on Jan. 23, 2023.

(51) Int. Cl.
*G01M 5/00* (2006.01)
*G08B 21/18* (2006.01)
*E04D 13/00* (2006.01)

(52) U.S. Cl.
CPC ........... *G01M 5/0033* (2013.01); *G08B 21/18* (2013.01); *E04D 13/006* (2013.01)

(58) Field of Classification Search
CPC .................................................. G01M 5/0033
See application file for complete search history.

(56) References Cited

U.S. PATENT DOCUMENTS

| | | | |
|---|---|---|---|
| 10,169,856 B1 * | 1/2019 | Farnsworth | G06F 18/22 |
| 10,713,726 B1 * | 7/2020 | Allen | G06Q 40/08 |
| 11,131,597 B1 * | 9/2021 | Oakes, III | G06T 17/00 |

(Continued)

*Primary Examiner* — Travis R Hunnings
(74) *Attorney, Agent, or Firm* — MARSHALL, GERSTEIN & BORUN LLP

(57) ABSTRACT

Techniques for detecting damage to a roofing structure and initiating remediation procedures are disclosed herein. An exemplary computer-implemented method may include receiving sensor data from a plurality of sensors located proximate to the roofing structure to monitor a plurality of environmental conditions. The exemplary method may include (1) identifying, by one or more processors, a type of damage within the roofing structure based upon the sensor data; (2) locating a position of the damage within the roofing structure; determining a set of remediation services based upon the type of damage; and (3) identifying one or more remediation service providers to perform the set of remediation services. The exemplary method may include generating and transmitting an alert signal to a computing device identifying the type of damage to the roofing structure and contact information corresponding to at least one or more remediation service providers.

20 Claims, 8 Drawing Sheets

(56) References Cited

U.S. PATENT DOCUMENTS

| | | | |
|---|---|---|---|
| 11,879,252 B2* | 1/2024 | Williams, II | G08B 21/18 |
| 2020/0134573 A1* | 4/2020 | Vickers | G06F 16/29 |
| 2024/0142329 A1* | 5/2024 | Tofte | E02D 19/06 |
| 2024/0338777 A1* | 10/2024 | Hurliman | G06Q 30/0633 |

* cited by examiner

SYSTEMS AND METHODS FOR DETECTING EMERGENCY CONDITIONS WITHIN A ROOFING STRUCTURE AND INITIATING REMEDIATION PROCEDURES

CROSS-REFERENCE TO RELATED APPLICATION

This application claims priority to U.S. Provisional Patent Application No. 63/440,562, entitled "Systems and Methods for Detecting Emergency Conditions Within a Roofing Structure and Initiating Remediation Procedures," filed on Jan. 23, 2023, the disclosure of which is hereby incorporated herein by reference.

TECHNICAL FIELD

The present disclosure generally relates to systems and methods for monitoring structures and devices, and more particularly, to detecting emergency conditions within roofing structures and initiating remediation procedures to alleviate/mitigate damaging effects of the emergency condition.

BACKGROUND

Generally speaking, home owners and property owners may be responsible for the maintenance, repair, and overall upkeep of their respective structures. As part of that responsibility, such owners may typically determine when and how to perform maintenance but may conventionally lack sufficient knowledge about when and how that maintenance should be performed. Many issues that may result in catastrophic damage to a roofing structure, such as damaged or rotting singles, damaged flashing, standing or pooling water, roof leaks, insufficient drainage, and many others may go unnoticed for months/years.

Conventional techniques may completely lack the capability to inform property owners about such issues. Namely, conventional techniques may involve an owner manually inspecting areas of the structure and devices within the structure for damage or other issues that may require maintenance/repair. Other conventional techniques may include a maintenance service provider contacting a home owner when regular maintenance for portions of the owner's structure or devices therein are scheduled for maintenance within the service provider's system. However, in either case, portions of the owner's structure or devices that are not included in the inspection/maintenance services provided by the maintenance service provider and/or randomly inspected by the owner themselves may remain completely unexamined for months/years. As a result, these conventional techniques frequently overlook portions of an owner's structure or devices that may desperately require maintenance or repair, such that the owner's structure/devices may experience catastrophic effects to a roofing structure (e.g., snow damage, hail damage, high wind damage, damage from trees and shrubbery, etc.) leading to exorbitantly expensive and/or irreparable damage.

These issues with conventional techniques are further compounded in circumstances where the owner's structure is subjected to extreme weather conditions that may cause months/years-worth of damage or wear in relatively short periods (e.g., minutes, hours, days). For example, hurricanes bring massive storm surges and high winds that may easily flood and/or otherwise damage poorly maintained structures or devices therein. In situations where a catastrophic event (e.g., hurricane, tornado, blizzard, snow, or ice storm, etc.) is approaching and an owner has not maintained their structure, the owner's life may also be in danger because the structure may lack the necessary robustness to avoid catastrophic damage from the event.

Therefore, in general, proper maintenance, repair, and overall upkeep of a structure and the systems/devices proximate to the structure is an area of great interest, and conventional techniques may be insufficient for providing such proper upkeep. Conventional techniques may also include additional ineffectiveness, inefficiencies, encumbrances, and/or other drawbacks.

SUMMARY

Generally, the present embodiments may relate to, inter alia, detecting emergency conditions within structures and determining a set of remediation services corresponding to the structure to provide property owners with (i) accurate, up-to-date information about potential hazardous/emergency conditions, and (ii) recommendations for mitigating and/or repairing any damaging effects. For instance, the present embodiments may relate to monitoring sensor data from sensors disposed proximate to a roofing structure and/or electronic sensors located within the roofing structure to detect emergency conditions exterior or internal to the roofing structure.

From these detected emergency conditions, the systems and methods of the present disclosure may determine a set of remediation services corresponding to the information provided by the electronic sensors placed within the roofing structure that may help a user/property owner (collectively referenced herein as "users" or a "user") mitigate and/or avoid damaging effects to the roofing structure over a period of time or from an emergency condition. The systems and methods of the present disclosure may also identify remediation service providers to provide such remediation services and transmit contact information of the providers to the property owners. In this manner, the systems and methods of the present disclosure may enable property owners to expeditiously mitigate and/or avoid damaging effects within and/or otherwise associated with their roofing structure while simultaneously enabling the property owner to take steps to fix, maintain, and/or otherwise improve the health or operating conditions of the roofing structure.

For example, the systems and methods of the present disclosure may generally determine that an emergency situation is and/or has taken place, and may automatically contact a remediation service provider to provide remediation services to help mitigate the negative impacts of the emergency. Further, in certain instances, the systems and methods of the present disclosure may detect a catastrophic event (e.g., hurricane, blizzard, heavy rain or snow, flash flooding, etc.) approaching a neighborhood or individual structure, and may initiate proactive procedures to notify users with recommendations or other suggestions to mitigate potential catastrophic damage to the user's structure.

In particular, the systems and methods of the present disclosure may detect damage to a roofing structure and contact a remediation services provider to provide remediation services that help mitigate the negative impacts of the emergency situation.

Additionally, the system and methods of the present disclosure may include an algorithm (e.g., as part of an emergency condition model) to receive sensor data from a plurality of sensors located proximate to the roofing structure, where the sensors are configured to monitor a plethora of environmental conditions. The algorithm may identify a type of damage within the roofing structure based upon the sensor data and locate a position of the damage within the roofing structure based upon the sensor data. Moreover, the systems and methods of the present disclosure may determine a set of remediation services based upon the type of damage, identify one or more remediation service providers to perform the set of remediation services, generate an alert signal identifying the type of damage to the roofing structure and contact information corresponding to at least one of the one or more remediation service providers, and transmit the alert signal to a computing device of a user associated with the roofing structure.

In some embodiments, the systems and methods of the present disclosure may determine proactive as well as reactive responses to emergency or other situations in regions that experience flash floods, hurricanes, and/or other emergencies. The systems and methods of the present disclosure may generally help to inform users that other people in their area/neighborhood are making a decision to leave in the event of a mandatory evacuation, etc. The systems and methods of the present disclosure may also let customers know about safe areas that have been setup to inform users about what resources are available, and may let the users know what is happening in their area as a result of fire, water damage, etc. In some instances, the systems and methods of the present disclosure may use sensor data and/or other data to forecast which structures may be exposed to fire, and/or flooding, and to predict where the fire/storm might be heading. In certain instances, the systems and methods of the present disclosure may also (in the event users need to evacuate) provide users with a path to navigate safely from their community. Additionally, if the user has a VR headset, the systems and methods of the present disclosure may show the user a virtual representation of the effects of the fire, hurricane, flash flood, etc. to help the user understand and/or gauge how extreme the effects/impacts of the event may be for the user and/or the user's structure.

One exemplary embodiment of the present disclosure may be a computer-implemented method for detecting damage to a roofing structure and initiating remediation procedures. The computer-implemented method may be implemented via one or more local or remote processors, servers, sensors, transceivers, memory units, mobile devices, wearables, smart glasses, smart watches, augmented reality glasses, virtual reality headset(s), mixed or extended reality glasses or headsets, smart contacts, voice bots or chat bots, and/or other electronic or electrical components, which may be in wired or wireless communication with one another. In one instance, the method may include: (1) receiving sensor data from a plurality of sensors located proximate to the roofing structure, the plurality of sensors being configured to monitor a plurality of environmental conditions; (2) identifying, by one or more processors, a type of damage within the roofing structure based upon the sensor data; (3) locating, by one or more processors, a position of the damage within the roofing structure based upon the sensor data; (4) determining, by one or more processors, a set of remediation services based upon the type of damage; (5) identifying, by one or more processors, one or more remediation service providers to perform the set of remediation services; (6) generating, by one or more processors, an alert signal identifying the type of damage to the roofing structure and contact information corresponding to at least one or more remediation service providers, and/or (7) transmitting, by one or more processors, the alert signal to a computing device of a user associated with the roofing structure. The method may include additional, less, or alternate actions and functionality, including that discussed elsewhere herein.

For instance, in a variation of this embodiment, the computer-implemented method may further include: (1) identifying a set of environmentally dangerous conditions based upon the sensor data; (2) generating an evacuation recommendation based upon the set of environmentally dangerous conditions; and/or (3) transmitting the evacuation recommendation to the computing device of the user associated with the roofing structure. Further in these variations, the computer-implemented method may further include: identifying at least one of the plurality of environmental conditions based upon the sensor data, the plurality of environmental conditions comprising at least one of: (i) precipitation, (ii) humidity, (iii) rain, (iv) snow, (v) sleet, (vi) hail, (vii) ice, (viii) wind, or (ix) changes in temperature over a period of time.

In another variation of this embodiment, the plurality of sensors is installed in contact with at least one of: (i) an exterior surface of the roofing structure, or (ii) an internal surface of the roofing structure. Further in these variations, the computer-implemented method may further include where on the exterior surface of the roofing structure the plurality of sensors may be positioned: (i) roof shingles, (ii) an eave, (iii) a fascia, (iv) a gable end, (v) a rake, (vi) a chimney flashing, (vii) a valley, (viii) a ridge, (ix) a soffit, (x) an abutment, (xi) a drip edge, (xii) a dormer edge, (xiii) a hip, (xiv) a hipped edge, (xv) a flashing, or (xvi) a rain gutter.

In yet another variation of this embodiment, the plurality of sensors may be installed in contact with the exterior surface of the roofing structure, such that there is at least one sensor per shingle, at least one sensor per every ten shingles, or at least one sensor per every twenty shingles. Another variation of this embodiment, the plurality of sensors may be impact sensors, wherein the impact sensors are configured to measure a load on the roofing structure. Further in these variations, the computer-implemented method may further include where on the internal surface of the roofing structure the plurality of sensors may be positioned: (i) an attic ceiling, (ii) attic rafters, (iii) attic sheathing, (iv) rafter vents, (v) a bottom surface of roof shingles, or (vi) an attic surface between the attic rafters.

Another exemplary embodiment of the present disclosure may be a computer system for detecting emergency conditions within structures and initiating remediation procedures. The computer system may include one or more local or remote processors, servers, sensors, transceivers, memory units, mobile devices, wearables, smart glasses, smart contact lenses, smart watches, augmented reality glasses, virtual reality headset(s), mixed or extended reality glasses or headsets, voice bots or chat bots, and/or other electronic or electrical components, which may be wired or wireless communication with one another. In one instance, the computer system may include: one or more processors; and a non-transitory computer-readable memory coupled to the one or more processors. The memory may store instructions thereon that, when executed by the one or more processors, cause the one or more processors to: (1) detect an emergency condition based upon sensor data from at least one sensor associated with a roofing structure; (2) determine a set of remediation services corresponding to the roofing structure based upon the emergency condition; (3) identify one or more remediation service providers to perform the set of remediation services to the roofing structure; (4) generate a remediation alert signal that may include contact information corresponding to at least one of the one or more remediation service providers; and/or (5) transmit the remediation alert signal to a user computing device of a user associated with the roofing structure. The computer system may include additional, less, or alternate functionality, including that disclosed elsewhere herein.

For instance, in a variation of this embodiment, the instructions, when executed, may further cause the one or more processors to determine the set of remediation services by determining a remediation action based upon the emergency condition, the remediation action being associated with sensor data from at least one sensor associated with the roofing structure.

In yet another variation of this embodiment, the instructions, when executed, may further cause the one or more processors to: (1) prior to detecting the emergency condition, detect a catastrophic event approaching the structure; (2) aggregate signal data from a plurality of sensors in a plurality of structures within a region including the structure; (3) determine an evacuation value associated with the region based upon the signal data from the plurality of devices; (4) generate an evacuation recommendation based upon the evacuation value, wherein the evacuation recommendation may include one or more recommended evacuation routes and one or more safe areas; and/or (5) cause the evacuation recommendation to be displayed to the user.

In another variation of this embodiment, the instructions, when executed, may further cause the one or more processors to be responsive to identifying at least one of a plurality of environmental conditions based upon the sensor data, the plurality of environmental conditions comprising at least one of: (i) precipitation, (ii) humidity, (iii) rain, (iv) snow, (v) sleet, (vi) hail, (vii) ice, (viii) wind, or (ix) changes in temperature over a period of time.

In accordance with the above, and with the disclosure herein, the present disclosure may include improvements in computer functionality or in improvements to other technologies at least because the disclosure describes that, e.g., a hosting server (e.g., central server), or otherwise computing device (e.g., a user computing device), is improved where the intelligence or predictive ability of the hosting server or computing device is enhanced by a trained impact model, a roofing model, an emergency condition model, and mapping model. These models, executing on the hosting server or user computing device, may be able to accurately and efficiently determine causes of damage to a roofing structure (e.g., hail damage), determine associated damage to any devices (e.g., sensors) associated with a roofing structure, detect emergency conditions and generate remediation alert signals, and/or generate regional maps based upon environmental data, contractor data, and/or geolocation data. That is, the present disclosure describes improvements in the functioning of the computer itself or "any other technology or technical field" because a hosting server or user computing device, is enhanced with various models to accurately predict, detect, determine, and generate user/owner-specific conditions and recommendations configured to improve the respective user/owner's maintenance and emergency preparedness efforts related to a structure and associated devices. This improves over the prior art at least because existing systems lack such predictive or classification functionality, and may simply not be capable of accurately analyzing such data on a real-time basis to output predictive and/or otherwise recommended results designed to improve a user/owner's overall upkeep and emergency preparedness efforts related to a structure and associated devices.

In certain instances, these models may be trained using machine learning, and may utilize machine learning during operation. Therefore, in these instances, the techniques of the present disclosure may further include improvements in computer functionality or in improvements to other technologies at least because the disclosure describes such models being trained with a plurality of training data (e.g., sensor data associated with sensors in proximity to shingles on a roofing structure (e.g., providing impact data from hail), environmental data, contractor data, geolocation data) to output the user/owner-specific conditions and recommendations configured to improve the respective user/owner's maintenance and emergency preparedness efforts related to a structure and associated devices.

Moreover, the present disclosure may include effecting a transformation or reduction of a particular article to a different state or thing, e.g., transforming or reducing the maintenance and general upkeep of a roof structure from a non-optimal or error state to an optimal state.

Still further, the present disclosure may include specific features other than what is well-understood, routine, conventional activity in the field, or adding unconventional steps that demonstrate, in various embodiments, particular useful applications, e.g., (1) detecting, by one or more processors, an emergency condition within a roofing structure based upon the sensors located within the roofing structure; (2) determining, by the one or more processors, a set of remediation services corresponding to the roofing structure based upon the emergency condition; and/or (3) identifying, by the one or more processors, one or more remediation service providers to perform the set of remediation services.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Exemplary Computing System

Figure 1:
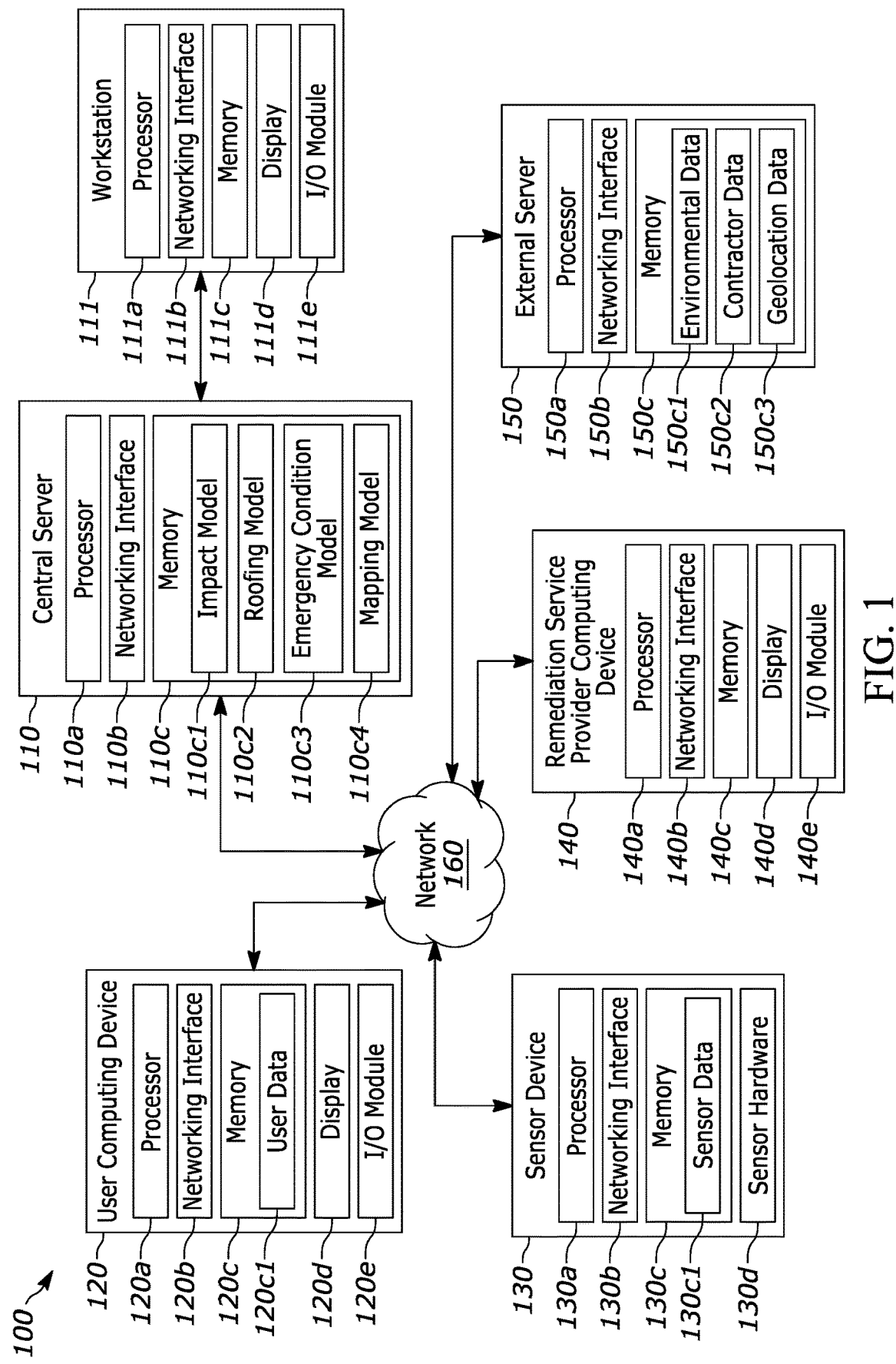
FIG. 1 depicts an exemplary computing system in which various embodiments of the present disclosure may be implemented.

FIG. 1 depicts an exemplary computing system 100 in which various embodiments of the present disclosure may be implemented. Depending on the embodiment, the exemplary computing system 100 may calculate/determine a recommended mitigation action, a recommended usage adjustment, a remediation alert signal, a roofing damage condition, a regional humidity level map, an alert signal, a predicted regional humidity level, a predicted alert signal, a set of regional zones, a cause of damage to a structure (e.g., a roofing structure), a structural recommendation, a virtual reality (VR) representation, an estimated maintenance value, a regional sensor data map, a proposed policy term adjustment, a damage mitigation recommendation, a preventative action signal, a remediation action signal, an evacuation recommendation, an emergency condition alert, and/or any other values or combinations thereof. Of course, it should be appreciated that, while the various components of the exemplary computing system 100 (e.g., central server 110, user computing device 120, sensor device 130, etc.) are illustrated in FIG. 1 as single components, the exemplary computing system 100 may include multiple (e.g., dozens, hundreds, thousands) of each of the components that are simultaneously connected to the network 160 at any given time.

Generally speaking, the exemplary computing system 100 may include a central server 110, a workstation 111, a user computing device 120, a sensor device 130, a remediation service provider computing device 140, and an external server 150. The central server 110 may generally receive data corresponding to one or more structures (e.g., from sensor device 130), and may process the data in accordance with one or more sets of instructions contained in the memory 110c to output any of the values previously described. The central server 110 may include one or more processors 110a, a networking interface 110b, and a memory 110c. The memory 110c may include various sets of executable instructions that are configured to analyze data received at the central server 110 and analyze that data to output various values. These executable instructions include, for example, an impact model 110c1, a roofing model 110c2, an emergency condition model 110c3, and a mapping model 110c4.

More specifically, the central server 110 may be configured to receive and/or otherwise access data from various devices (e.g., sensor device 130), and may utilize the processor(s) 110a to execute the instructions stored in the memory 110c to analyze and/or otherwise process the received data. As an example, the central server 110 may receive sensor data from the sensor device 130 in circumstances where the sensor device 130 is disposed proximate to a structure (not shown). The sensor data may comprise impact data indicating, for example, a load on a roofing structure, as measured and/or otherwise sensed by the sensor device 130. Accordingly, the central server 110 may utilize the processor(s) 110a to execute the impact model 110c1 stored in the memory 110c to determine a roofing damage condition of a roofing structure based upon the sensor data identifying environmental conditions that may affect the roofing structure. More generally, the impact model 110c1 may receive sensor data as input, and may output a roofing damage condition based on the sensor data.

In particular, the sensor data may reflect and/or otherwise indicate environmental conditions such as precipitation, humidity, rain, snow, sleet, hair, ice, wind, or a change in temperature. These indicated environmental conditions may affect various portions of the roof from shingles, to gutters, to eaves, etc., such that the sensor data may represent the affects. For example, a sensor disposed under and/or otherwise proximate to a shingle may indicate that the shingle is receiving frequent impacts during a first time period that is consistent with hail. The processors 110a may correlate and/or otherwise analyze this sensor data in conjunction with the environmental data 150c1 to confirm that the shingle was subject to hail fall during the first time period. The processors 110a may also input the sensor data from the first time period into the impact model 110c1 to determine whether the roofing structure has suffered a roofing damage condition as a result of the hail fall.

As another example, the central server 110 may receive sensor data from the sensor device 130 (e.g., an impact sensor positioned on the roofing structure) in circumstances where the sensor device 130 is disposed proximate to and/or otherwise coupled with a device (not shown) associated with a structure, for example a shingle. The sensor data may include electrical consumption data of the impact sensor, and may otherwise generally indicate an amount, degree, and/or type of usage of the device over time, as measured and/or otherwise sensed by the sensor device 130. Accordingly, the central server 110 may utilize the processor(s) 110a to execute the roofing model 110c2 stored in the memory 110c to determine a health status of the sensor devices 130 based upon a position of a sensor device 130 and on the condition of the sensor devices 130 associated with the roofing structure, as represented by the sensor data.

Additionally, or alternatively, the roofing model 110c2 may analyze the sensor data from the sensor device 130, and may output a health status of the roofing structure and/or any suitable portion(s) of the roofing structure. For example, the sensor data may indicate that rainfall on the roofing structure are causing exaggerated and/or otherwise abnormal loads or resulting vibrations. As a result, the roofing model 110c2 may receive this sensor data as input, and may output a health status of the roofing structure indicating that the roofing structure may be suffering from structural instability due to rot, termites, and/or other degradation over time that should be repaired/replaced.

Yet another example, the central server 110 may receive data from the sensor device 130 in circumstances where the sensor device 130 is disposed proximate to a structure, disposed proximate to and/or otherwise coupled with a device, and/or otherwise generating/recording data that is associated with a structure/device. The data received from the sensor device 130 may represent significant deviation(s) from normal operating conditions within or otherwise associated with the structure/device, such that the central server 110 may utilize the processor(s) 110$a$ to execute the emergency condition model 110$c$3 stored in the memory 110$c$. The emergency condition model 110$c$3 may detect an emergency condition (e.g., water leakage in a roofing structure) within the structure/device and may also determine a set of remediation services (e.g., offered by a service provider utilizing the remediation service provider computing device 140) that may be integral to remediating damage caused by the emergency condition.

As still another example, the central server 110 may aggregate sensor data and/or emergency condition data from a plurality of sensor devices in a plurality of locations (e.g., represented collectively in this example by sensor device 130) and/or historical sets of such data for the plurality of locations to develop a visual mapping corresponding to the data for display to users that may want a broader perspective of issues associated with such data (e.g., multiple sensors attached to roofing shingles to provide a map of a roofing structure and, for example, water pooling). Accordingly, the central server 110 may utilize the processor(s) 110$a$ to execute the mapping model 110$c$4 stored in the memory 110$c$ to create a regional map of impact data (e.g., rain, hail, sleet), regional zones representative of historical levels of rainfall/humidity (e.g., rainfall including rain, snow, hail, sleet), and/or any other suitable maps or combinations thereof.

In order to execute these or other instructions stored in memory 110$c$, the central server 110 may communicate with a workstation 111. The workstation 111 may generally be any computing device that is communicatively coupled with the central server 110, and more particularly, may be a computing device with administrative permissions that enable a user accessing the workstation 111 to update and/or otherwise change data/models/applications that are stored in the memory 110$c$. For example, the workstation 111 may enable a user to access the central server 110, and the user may train the models 110$c$1-$c$4 that are stored in the memory 110$c$. As discussed herein, in certain embodiments, one or more of the models 110$c$1-$c$4 may be trained by and may implement machine learning (ML) techniques. In these embodiments, the user accessing the workstation 111 may upload training data, execute training sequences to train the models 110$c$1-$c$4, and may update/re-train the models 110$c$1-$c$4 over time. The workstation 111 may include one or more processors 111$a$, a networking interface 111$b$, a memory 111$c$, a display 111$d$, and an input/output (I/O) module 111$e$.

In some embodiments, the central server 110 may store and execute instructions that may generally train the various models 110$c$1-$c$4 stored in the memory 110$c$. For example, the central server 110 may execute instructions that are configured to train the impact model 110$c$1 to output the roofing damage condition on a roofing structure, train the roofing model 110$c$2 to output the health status of a roofing structure and/or a sensor disposed proximate to the roofing structure, train the emergency condition model 110$c$3 to output the detected emergency condition and/or set of remediation services, and/or train the mapping model 110$c$4 to output the regional map of impact data and/or regional zones representative of historical levels of rainfall/humidity using training dataset(s).

In particular, the training dataset(s) may include a plurality of training sensor data, a plurality of training roofing damage conditions, a plurality of training health statuses, a plurality of training emergency conditions, a plurality of training sets of remediation services, a plurality of training aggregate sensor/historical data, a plurality of regional humidity level signals/data, and a plurality of training maps, and/or any other suitable data and combinations thereof. In certain embodiments, any of the impact model 110$c$1, the roofing model 110$c$2, the emergency condition model 110$c$3, and/or the mapping model 110$c$4 may be a rules-based algorithm configured to receive sensor data, aggregated sensor data and/or historical sensor data, and/or humidity level signals/data as input and to output a roofing damage condition, a health status, an emergency condition and set of remediation services, and/or respective maps.

However, in some aspects, the central server 110 may utilize one or more machine learning (ML) techniques to train the impact model 110$c$1, the roofing model 110$c$2, the emergency condition model 110$c$3, and/or the mapping model 110$c$4 as a ML model. The impact model 110$c$1, the roofing model 110$c$2, the emergency condition model 110$c$3, and/or the mapping model 110$c$4 may be trained using a training dataset that may include a plurality of training sensor data (e.g., a plurality of training impact signals/data) and a plurality of training roofing damage conditions, a plurality of training health statuses, a plurality of training emergency conditions, a plurality of training sets of remediation services, a plurality of training aggregate sensor/historical data, a plurality of regional humidity level signals/data, and a plurality of training maps, and/or any other suitable data and combinations thereof.

The impact model 110$c$1 may use the training dataset to (during execution using real-time data) output a roofing damage condition based upon detected hail, rain, snow, and/or any other environmental condition(s) (e.g., high winds such as a hurricane) proximate to a roofing structure, and/or to output a recommended mitigation action or cause of damage to the roofing structure. The roofing model 110$c$2 may use the training dataset to (during execution using real-time data) output a health status of a roofing structure and/or a device disposed near the roofing structure based upon a usage level and/or other conditions derived from sensor data of the sensor devices 130 associated with the roofing structure. The emergency condition model 110$c$3 may use the training dataset to (during execution using real-time data) output a detected emergency condition associated with a roofing structure, and/or to output a set of remediation services corresponding to the roofing structure based upon the emergency condition. The mapping model 110$c$4 may use the training dataset to (during execution using real-time data) output a regional level map of hazardous conditions affecting multiple roofing structures, regional zones representative of historical environmental data (e.g., historical humidity levels), a regional device usage map, and/or other suitable maps.

Generally speaking, ML techniques have been developed that allow parametric or nonparametric statistical analysis of large quantities of data. Such ML techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML, and/or reinforcement techniques (such as with ChatGPT or other "smart" voice bot techniques).

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the central server 110 to train the impact model 110c1, the roofing model 110c2, the emergency condition model 110c3, and/or the mapping model 110c4. The impact model 110c1, the roofing model 110c2, the emergency condition model 110c3, and/or the mapping model 110c4 may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to sensor data 130c1, environmental data 150c1, contractor data 150c2, geolocation data 150c3, and/or other data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the impact model 110c1, the roofing model 110c2, the emergency condition model 110c3, and/or the mapping model 110c4 may be used to output a roofing damage condition, a health status (e.g., of a roofing structure and/or a sensor device 130), an emergency condition and set of remediation services, and/or respective maps, using artificial intelligence (e.g., a ML model of the impact model 110c1, the roofing model 110c2, the emergency condition model 110c3, and/or the mapping model 110c4) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

In one example, the impact model 110c1 may receive sensor data and may determine a roofing damage condition from impacts to shingles on a roofing structure, a recommended mitigation action, and/or the cause of the damage to the roofing structure. The central server 110 may then generate an alert signal that indicates the roofing damage condition, the recommended mitigation action, and/or the cause of the damage to the roofing structure.

For example, the impact model 110c1 may receive sensor data indicating that the roofing structure is experiencing an excessive amount of hail that is impacting and/or accumulating on the roofing structure, which may damage shingles and/or underlying portions of the roofing structure. When the impact model 110c1 receives this sensor data, the model 110c1 may output a roofing damage condition corresponding to the excessive hail fall along with a recommended action of contacting a contractor to mitigate and repair any damage to the roofing structure (e.g., shingle damage). Namely, the roofing damage condition may include and/or otherwise indicate a leak in the roofing structure that requires repair. In this example, the central server 110 may generate an alert signal that indicates the water leaking from the roofing structure and associated damage to the roofing structure caused by the storm, along with the recommendation to contact a contractor to repair the roof and any damage to the associated structures of the home. Of course, it should be understood that excessive hail fall is simply one exemplary environmental condition that may impact the roofing structure, and that any suitable environmental condition(s) may be analyzed/evaluated by the systems of the present disclosure (e.g., excessive snowfall accumulation resulting in an excessive weight/load placed on the roofing structure).

In this manner, the impact model 110c1 may generally determine/evaluate acute damage to a roofing structure as a result of adverse environmental conditions. For example, the impact damage from hail fall, excessive snowfall accumulation, wind-driven damage, and/or other conditions may generate sensor data that, when evaluated by the impact model 110c1, yields a roofing damage condition that represents the specific type of damage resulting from the conditions. As mentioned, this roofing damage condition may also indicate where the damage to the roofing structure is located, and a degree of damage to the roofing structure at each relevant location.

For example, the roofing model 110c2 may determine that one or more impact sensors have failed, and the model 110c2 may further generate a recommended repair indicating that the user should repair/replace the sensors to avoid sensor failure and schedule more regular maintenance/repair to avoid potential failure to the roofing structure. In this example, the central server 110 may generate an alert signal that indicates the excessive failure of one or more sensors associated with one or more shingles on the roofing structure and may also provide an indication of failure of a particular area of the roofing structure associated with the failed sensors and the recommended repair of the impact sensors.

Additionally, or alternatively, the roofing model 110c2 may receive the sensor data and may output a roofing structure health status indicating that a particular portion of the roofing structure has a poor health condition. To illustrate, the sensor data may indicate that one or more portions of the roofing structure are succumbing to rot as a result of excessive humidity, such that the one or more portions of the roofing structure should be repaired/replaced immediately to avoid an emergency condition (e.g., roofing structure collapse). The roofing model 110c2 may receive this sensor data, output the health status of the roofing structure, and may deliver this output health status in an alert signal indicating to a user that the one or more portions of the roofing structure should be repaired/replaced as soon as possible to avoid the emergency condition.

In this manner, the roofing model 110c2 may generally determine/evaluate chronic and/or long-term damage to a roofing structure. For example, the long-term damage from excessive humidity, termite infestation, wood rot, shingle loosening, worn flashing, rust, and/or other conditions may generate sensor data that, when evaluated by the roofing model 110c2, yields a roofing structure health status and/or a sensor health status that represents the specific type of degradation resulting from the conditions. As mentioned, these health statuses may also indicate where the damage to the roofing structure and/or the faulty/damaged sensor is located, and a degree of damage to the roofing structure/sensor at each relevant location. In addition, the roofing model 110c2 may generally determine/evaluate long-term issues associated with the sensor devices 130 (e.g., loosening of sensor at attachment points, sensor sensitivity degradation, miscalibration of sensor, failed sensor, etc.).

In any event, the central server 110 may then transmit an alert signal to the user computing device 120 for display to a user. Moreover, in certain embodiments, the central server 110 may also transmit the alert signal to the remediation service provider computing device 140 to initiate potential communication between the remediation service provider and the user. Such potential communication may be or include a phone call, web chat, email, text message, or other communication medium initiated by the central server 110, and/or the central server 110 may provide contact information to both the user and the remediation service provider.

When the roofing model 110c2 receives sensor data to determine the health status of the roofing structure, the sensor(s) disposed proximate to the roofing structure, and/or the recommended usage adjustment, the central server 110 may cause the health status and/or recommended usage adjustment to be displayed for a user (e.g., via user computing device 120). For example, the roofing model 110c2 may determine that the roofing structure is experiencing an excessive amount of snow accumulation, which may cause damage to the roofing structure because of the weight/load placed on the roofing structure. Thus, the health status of the roofing structure may indicate that the roofing structure is relatively damaged due to the stress caused by the excessive snow accumulation, and may require repair from a remediation service provider. Similarly, the health status of a sensor (e.g., sensor device 130) disposed proximate to the roofing structure may indicate that the sensor has malfunctioned based on erroneous measurements and/or other indications in the sensor data, and that the sensor requires repair/replacement.

The recommended usage adjustment may include recommendations regarding adjustments to usage and/or regular maintenance of the roofing structure components and/or sensors. For example, the roofing model 110c2 may receive sensor data indicating that a gutter is clogged, causing substantial rain water accumulation in the gutters. The recommended usage adjustment output by the roofing model 110c2 may recommend to a user that the user inspect/clear their gutters more regularly, and check the attachment points of the gutters to the roofing structure to ensure that the rain water accumulation has not caused them to rust and/or otherwise damaged the attachment points.

Moreover, the roofing model 110c2 may output a recommended usage adjustment that includes a suggestion that a user contact a contractor to evaluate, mitigate, and/or repair any damage to the roofing structure, other external structures (e.g., eaves, gutters), and/or internal structures (e.g., attic). For example, the central server 110 may also generate an alert signal that indicates water leaking from the roofing structure, associated damage to the roofing structure, and a recommendation to contact a contractor to repair the roof and any damage to the associated structures of the home.

The central server 110 may then transmit the alert signal to the user computing device 120 for display to a user. Moreover, in certain embodiments, the central server 110 may also transmit the alert signal to the remediation service provider computing device 140 to initiate potential communication between the remediation service provider and the user. Such potential communication may be or include a phone call, web chat, email, text message, or other communication medium initiated by the central server 110, and/or the central server 110 may provide contact information to both the user and the remediation service provider.

When the emergency condition model 110c3 detects the emergency condition and/or determines the set of remediation service, the central server 110 may generate a remediation alert signal that indicates the emergency condition, the set of remediation services, and/or contact information corresponding to at least one remediation service provider. For example, the emergency condition model 110c3 may detect a leak in the roofing structure and may determine that roofing remediation services may be required. In this example, the central server 110 may generate a remediation alert signal that indicates the damage to the roofing structure causing a leak into the attic, the recommend remediation services to repair the roofing structure, and/or contact information corresponding to a roofing remediation service provider.

When the mapping model 110c4 determines a respective map (e.g., a regional map indicating high winds for hurricane conditions, a regional map of impact data, a regional map of humidity levels, a regional map of historical rainfall/humidity, etc.), the central server 110 may cause the respective map to be displayed to a user via the user computing device 120. For example, the mapping model 110c4 may create a regional map that represents environmental conditions in a region that may include high winds and rainfall associated with a hurricane from a plurality of sensors that are disposed proximate to a plurality of roofing structures in this region. Additionally, the mapping model 110c4 may create a regional map of impact data (e.g., houses in an area/region that have been affected, for example, by hail). Further, the mapping model 110c4 may create a region map of several regions indicating a humidity level for the purpose of tracking a storm system. Also, the mapping model 110c4 may create a regional map of historical environmental conditions in an area (e.g., historical levels of rainfall, snowfall, ice, humidity, temperature, etc.) In this example, the central server 110 may then transmit the regional map to the user computing device 120 for display to a user as part of a graphical user interface (GUI) displayed on the display 120d, and as discussed herein.

Regardless, the central server 110 may transmit the outputs of any of these models 110c1-c4 or other instructions executed by the processor(s) 110a to the user computing device 120 that is operated by a user associated with a structure/device. The user may then view the user computing device 120 to determine how to proceed with maintenance, repair, mitigation, remediation, evacuation, and/or other actions/recommendations indicated in the data/alerts transmitted by the central server 110. For example, the central server 110 may transmit an alert to the user computing device 120 indicating that a catastrophic event is approaching the user's structure. The user may view this alert on the user computing device 120, and the user may proceed with emergency preparedness measures corresponding to the catastrophic event (e.g., boarding windows/doors, stockpiling water, insulating pipes, etc.). Thereafter, the user may also determine that evacuating in advance of the catastrophic event reaching the structure is advantageous, and the user may utilize evacuation routes and safe areas indicated in the alert displayed on the user computing device 120 to reach a safe distance from the catastrophic event.

More generally, the user computing device 120 may be associated with (e.g., in the possession of, configured to provide secure access to, etc.) a particular user, who may be associated with a roofing structure (e.g., homeowner) or device. The user computing device 120 may be a personal computing device of that user, such as a smartphone, a tablet, smart glasses, or any other suitable device or combination of devices (e.g., a smart watch plus a smartphone) with wireless communication capability. In the embodiment of FIG. 1, the user computing device 120 may include a processor 120a, a networking interface 120b, a memory 120c, a display 120d, and a I/O module 120e. The memory 120c may also include user data 120c1 that may be or include any suitable data, such as structures/devices associated with the user, maintenance histories of the user's structures/devices, and/or any other suitable data or combinations thereof.

The user computing device 120 may be communicatively coupled to the central server 110, the sensor device 130, the remediation service provider computing device 140, and/or the external server 150. For example, the user computing device 120 and the central server 110, the sensor device 130, the remediation service provider computing device 140, and/or the external server 150 may communicate via USB, Bluetooth, Wi-Fi Direct, Near Field Communication (NFC), etc. For example, the central server 110 may transmit a roofing damage condition, a health status, an emergency condition and set of remediation services, respective maps, and/or alerts to the user computing device 120 via the networking interface 110b, which the user computing device 120 may receive via the networking interface 120b.

Further, the user computing device 120 may obtain data corresponding to a roofing structure or device (e.g., impact sensor) that may be uploaded to the central server 110 for analysis by one or more of the models 110c1-c4 and/or other instructions stored in the memory 110c. For example, a user may take a photograph of a roofing structure and/or a device (e.g., impact sensor) or input information corresponding to the roofing structure and/or device into the user computing device 120, and the user computing device 120 may transmit the photograph or other sensor information to the central server 110 to analyze the data (e.g., via a CNN, machine vision algorithms, natural language understanding algorithms, and/or other suitable algorithms). The central server 110 may then generate a communication that may include the results of the data analysis and may transmit the communication to the user computing device 120 via the networking interface 110b.

The sensor device 130 may generally be or include any suitable type of sensor that may measure, generate, record, and/or otherwise sense some physically observable quality of a roofing structure and/or a device. For example, the sensor device 130 may be an impact sensor attached to a shingle on the roofing structure, where the sensor may identify environmental conditions such as precipitation, humidity, rain, snow, sleet, hail, ice, wind and changes in temperature. Further, the sensor device 130 may be disposed in any suitable location on the roofing structure, such as roofing shingles, an eave, a fascia, a gable end, a rake, a chimney flashing, a valley, a ridge, a soffit, an abutment, a drip edge, a dormer edge, a hip, a hipped edge, a flashing, a rain gutter, etc., and/or in any other suitable location where the sensor device 130 may be suitably positioned to measure, generate, record, and/or otherwise sense the environmental conditions and physically observable quality of the corresponding structure and/or device. The sensor device 130 may also be or include any suitable number of individual sensors that are disposed at any suitable location(s) on a roofing structure. For example, the sensor device 130 may include a plurality of sensors that are disposed at multiple different locations within and/or otherwise proximate to the roofing structure, as described herein in reference to FIGS. 3A-3C.

The remediation service provider computing device 140 may be associated with (e.g., in the possession of, configured to provide secure access to, etc.) a particular remediation service provider employee, who may communicate with a user through the user computing device 120 and/or the central server 110 to schedule remediation services corresponding to the user's roofing structure/device. The remediation service provider computing device 140 may be a company computing device issued to that employee and/or otherwise utilized by employees of the remediation service provider, such as a smartphone, a tablet, smart glasses, or any other suitable device or combination of devices (e.g., a smart watch plus a smartphone) with wireless communication capability. In the embodiment of FIG. 1, the remediation service provider computing device 140 may include a processor 140a, a networking interface 140b, a memory 140c, a display 140d, and a I/O module 140e.

The external server 150 may be or include computing servers and/or combinations of multiple servers storing data that may be accessed/retrieved by the central server 110, the user computing device 120, and/or the remediation service provider computing device 140. The data stored by the external server 150 may include environmental data 150c1, contractor data 150c2, and/or geolocation data 150c3. Generally speaking, each of the environmental data 150c1, the contractor data 150c2, and/or the geolocation data 150c3 may be accessed, retrieved, and/or otherwise received by the central server 110, and may be utilized by the models 110c1-c4 to generate the outputs of those models 110c1-c4. The external server 150 may include a processor 150a, a networking interface 150b, and a memory 150c that may include the environmental data 150c1, the contractor data 150c2, and the geolocation data 150c3.

The environmental data 150c1 may include data corresponding to weather and/or other meteorological conditions in regions which the central server 110 may include, for example, when utilizing the mapping model 110c4 to output respective maps. Each region described and/or otherwise indicated in the environmental data 150c1 may be a country, a state, a province, a county, a parish, a city, a town, etc., and/or a sub-region therein or any suitable area. In particular, the environmental data 150c1 may include, without limitation, radar data for each region, historical rainfall (e.g., snow, rain, hail, sleet) data and/or humidity data for each region, and/or other data corresponding to each region.

The contractor data 150c2 may include data corresponding to contractor information and/or other construction/maintenance information for roofing structures/devices in regions which the central server 110 may include, for example, when utilizing the mapping model 110c4 to output respective maps. Each region described and/or otherwise indicated in the contractor data 150c2 may be a country, a state, a province, a county, a parish, a city, a town, etc., and/or a sub-region therein or any suitable area. In particular, the contractor data 150c2 may include, without limitation, contractors that built/maintained roofing structures in each region, service providers that built/maintained roofing devices (e.g., electrical boxes, HVAC components) in each region, maintenance/repair values for each region, historical sensor data for each region, and/or other data corresponding to each region.

The geolocation data 150c3 may include data corresponding to structural modifications/adjustments and/or other geographical or structural data in regions which the central server 110 may include, for example, when utilizing the mapping model 110c4 to output respective maps. Each region described and/or otherwise indicated in the geolocation data 150c3 may be a country, a state, a province, a county, a parish, a city, a town, etc., and/or a sub-region therein or any suitable area. In particular, the geolocation data 150c3 may include, without limitation, catastrophic event data for each region, topographic data for each region, roofing structural modifications/adjustment data for each region, and/or other data corresponding to each region.

Each of the processors 110a, 111a, 120a, 130a, 140a, 150a may include any suitable number of processors and/or processor types. For example, the processors 110a, 111a, 120a, 130a, 140a, 150a may include one or more CPUs and one or more graphics processing units (GPUs). Generally, each of the processors 110a, 111a, 120a, 130a, 140a, 150a may be configured to execute software instructions stored in each of the corresponding memories 110c, 111c, 120c, 130c, 140c, 150c. The memories 110c, 111c, 120c, 130c, 140c, 150c may include one or more persistent memories (e.g., a hard drive and/or solid state memory) and may store one or more applications, modules, and/or models, such as the impact model 110c1, the roofing model 110c2, the emergency condition model 110c3, and the mapping model 110c4.

The networking interface 110b may enable the central server 110 to communicate with the workstation 111, the user computing device 120, the sensor device 130, the remediation service provider computing device 140, the external server 150, and/or any other suitable devices or combinations thereof. More specifically, the networking interface 110b enables the central server 110 to communicate with each component of the exemplary computing system 100 across the network 160 through their respective networking interfaces 110b, 111b, 120b, 130b, 140b, 150b. The networking interface 110b may support wired or wireless communications, such as USB, Bluetooth, Wi-Fi Direct, Near Field Communication (NFC), etc. The networking interface 110b may enable the central server 110 to communicate with the various components of the exemplary computing system 100 via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

It will be understood that the above disclosure is one example and does not necessarily describe every possible embodiment. As such, it will be further understood that alternate embodiments may include fewer, alternate, and/or additional steps or elements.

Exemplary Workflow for a Computing Device

Figure 2:
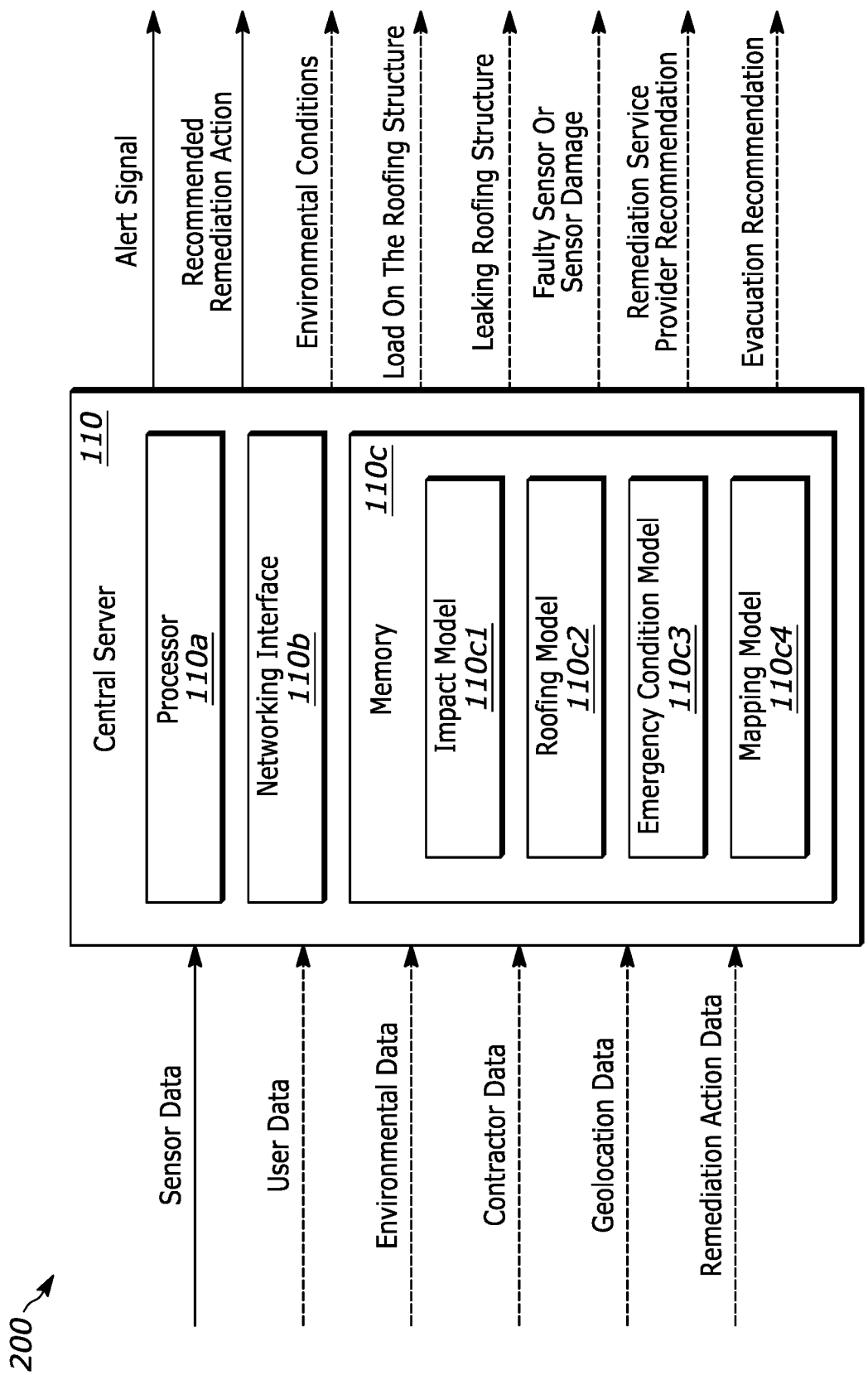
FIG. 2 depicts a first exemplary workflow for a computing device of FIG. 1, in accordance with various embodiments described herein.

FIG. 2 depicts an exemplary workflow 200 for a computing device (e.g., the central server 110), in accordance with various embodiments described herein. The exemplary workflow 200 generally illustrates various data received/retrieved by the central server 110 that is utilized by the impact model 110c1, the roofing model 110c2, the emergency condition model 110c3, and/or the mapping model 110c4 as inputs to generate various outputs. The various data received/retrieved by the central server 110 may be and/or include sensor data, user data (e.g., homeowner information), environmental data, contractor data, geolocation data, and/or remediation action data. The various outputs generated by the central server 110 based upon the received/retrieved data may include alert signal(s), environmental conditions (e.g., high humidity, thunderstorm, hurricane conditions), load on the roofing structure (e.g., snow), a leaking roofing structure indication, a faulty sensor or sensor damage indication, recommended remediation action(s) (e.g., removing pooling water from location of roof damage), a remediation service provider recommendation, and/or an evacuation recommendation.

As previously described, the sensor data, user data, environmental data, contractor data, geolocation data, and/or remediation action data received/retrieved by the central server 110 may include a large variety of specific information/data. For example, the sensor data may include information relevant/associated to sensor function (e.g., sensor identification number, position of the sensor on the roofing structure, relative position to other sensors, the sensor signal, sensor age, sensor functionality, time-stamp data for the signal), and the user data may include user profile data, including information relevant/associated to the user's profile (e.g., user account identification number, location of user and/or structure, estimated and/or actual occupancy of the structure, etc.). Of course, the memory 110c of the central server 110 and/or any other suitable external storage location (e.g., memory 150c of the external server 150) may store received/retrieved user data, as well as any received/retrieved sensor data, environmental data, contractor data, geolocation data, and/or the remediation action data.

As previously discussed, the environmental data may generally include information relevant/associated to environmental conditions. The environmental data may include, for example, precipitation data (e.g., rain, snow, hail, sleet, humidity), temperature data, radar data, wind data, forecasted weather, and/or any other data related to environmental conditions. Further, the contractor data may include data corresponding to contractor information and/or other construction/maintenance information for roofing structures/devices in regions which the central server 110 may include, for example, when utilizing the mapping model 110c4 to output respective maps. In particular, the contractor data may include, without limitation, contractors that built/maintained roofing structures in each region, service providers that built/maintained roofing devices (e.g., electrical boxes, HVAC components) in each region, maintenance/repair values for each region, historical sensor data for each region, and/or other data corresponding to each region.

Moreover, the geolocation data may include data corresponding to structural modifications/adjustments and/or other geographical or structural data in regions which the central server 110 may include, for example, when utilizing the mapping model 110c4 to output respective maps. In particular, the geolocation data may include, without limitation, catastrophic event data for each region, topographic data for each region, roofing structural modifications/adjustment data for each region, and/or other data corresponding to each region.

The remediation action data may generally include information relevant/associated to remediation action(s) of a roofing structure and/or any corresponding structures/devices. For example, the remediation action data may include a catalog of remediation actions, values to determine when a remediation action is recommended over another remediation action, a catalog of remediation protocols based on various conditions to the roofing structure (e.g., faulty sensor, loose shingle, water pooling, predicted environmental conditions, etc.), and/or a catalog of remediation/emergency services (e.g., roofing repair).

Using this data as inputs, one or more of the models 110c1-c4 may determine one or more of the outputs, such as alert signal(s), environmental conditions, a load on the roofing structure indication, a leaking roofing structure indication, a faulty sensor or sensor damage indication, recommended remediation action(s), a remediation service provider recommendation, and/or an evacuation recommendation. Of course, in certain instances, the models 110c1-c4 may not receive user data, environmental data, contractor data, geolocation data, and/or remediation action data. In these instances, the models 110c1-c4 may receive only sensor data of a particular sensor (e.g., an impact signal), and may thereby detect a status change (e.g., a roofing damage condition, health status) of the roofing structure proximate to the sensor sending the signal. One or more of the models 110c1-c4 may then generate an alert signal, as an output, indicating the status change.

In certain embodiments, the one or more of the models 110c1-c4 may be configured to determine a general recommended remediation action to be included in the generated alert signal if the models 110c1-c4 do not retrieve and/or otherwise receive remediation action data. However, in some aspects, the models 110c1-c4 may require one or more of the sensor data, the remediation action data, the environmental data, the contractor data, the geolocation data, and/or the user data to generate one or more of the alert signal(s) and recommended remediation action(s). In some embodiments, the alert signal(s) and/or the recommended remediation action(s) may include any of the location of damage to the roofing structure, the load on the roofing structure, the leaking roofing structure indication, the faulty sensor or sensor damage indication, the remediation service provider recommendation, and/or the evacuation recommendation.

As an example, the impact model 110c1 may receive a plurality of sensor data (e.g., impact to the roof from hail, a high wind condition, torrential rain, heavy snow, etc.) and the model 110c1 may proceed to analyze the sensor data in order to generate corresponding outputs. More specifically, the plurality of sensor data may indicate an acute status change to the roofing structure (e.g., detached/damaged shingle(s) from hail fall) and the impact model 110c1 may generate an alert signal indicating the acute status change to the roofing structure. The impact model 110c1 may also utilize remediation action data and environmental data to determine a recommended remediation action. For example, the impact model 110c1 may evaluate the sensor data in tandem with the environmental data to determine/confirm that hail fall has caused the status change to the roofing structure, and may also output a recommended remediation action (e.g., shingle replacement/repair) based on the status change resulting from the hail fall.

In another example, the impact model 110c1 may utilize environmental data (e.g., high winds from a hurricane or a tornado) to generate an alert signal including an environmental condition indicating that a hurricane/tornado is approaching the user's roofing structure. In this example, the impact model 110c1 may also include a recommended action such as an evacuation recommendation as part of the alert signal based on the approaching environmental condition.

In certain embodiments, the models 110c1-c4 may not generate an alert signal and/or may not include a recommended remediation action due to the determined status change of the roofing structure being minimal and/or otherwise negligible, as determined by the models 110c1-c4 and/or the user data. For example, the emergency condition model 110c3 may determine and/or the user data may indicate a user's preference that the alert signal should not include any information because, for example, an elevated wind speed is less than a historical threshold for the region including the roofing structure.

As another example, the roofing model 110c2 may determine and/or the user data may indicate a user's preference that the alert signal not be generated unless a threshold condition is met for a health status change of the roofing structure and/or proximate sensors. Namely, the roofing model 110c2 may determine and/or the user may indicate a preference that the alert signal should include information indicating that "a status change is detected, expect heavy wind and rain for the coming hour" because environmental conditions (e.g., humidity, wind, temperature conditions) are indicative of minimal potential damage to the roofing structure. Accordingly, a detected change of environmental conditions from one or more sensors on the roofing structure, which may cause the central server 110 to detect a status change, may be within an expected function of the sensors, and as a result, may not necessitate an alert signal or a remediation action.

In another example, the emergency condition model 110c3 may detect a status change based on a comparison of environmental conditions (e.g., changes in humidity) with historical and/or regional environmental conditions, and/or with environmental data that corresponds to certain environmental conditions. To illustrate, the detection of a status change may include the emergency condition model 110c3 determining a change in the humidity level from normal humidity levels for the region that indicates an approaching storm system based on the sensor data and environmental data. The emergency condition model 110c3 may then provide an alert signal indicating the coming changes to the environmental conditions that may cause damage to the roofing structure.

In some embodiments, the models 110c1-c4 may also receive/retrieve user data indicating feedback on the outputs of the models 110c1-c4. For example, a user may have received an alert signal indicating a status change in an area of the roofing structure as a result of an environmental condition. In certain instances, the user may have the option to positively and/or negatively verify the status change has occurred by observing the status change in person (or by proxy) and confirming the status change is present (i.e., positive verification) or not present (i.e., negative verification). If the user positively verifies the status change, one or more of the models $110c1$-$c4$ may receive/retrieve a positive verification signal. If the user negatively verifies the status change, then one or more models $110c11$-$c4$ may receive/retrieve a negative verification signal. In either case, the positive verification signal and/or the negative verification signal may be input to any of the models $110c1$-$c4$ as training data to re-train the models $110c1$-$c4$ based on the accuracy of the prior output(s).

For example, a user may receive an alert signal indicating that a central portion of the roofing structure is damaged as a result of excessive snowfall accumulation. The user may proceed to view the roofing structure and assess whether or not the central portion of the roofing structure is actually damaged in the location and/or to the extent identified in the alert signal. If the user determines that the roofing structure is damaged as indicated in the alert signal, the user may provide a positive verification signal, and if not, the user may provide a negative verification signal. Regardless, the central server 110 may receive the verification signal(s) from the user, and may re-train the model(s) $110c1$-$c4$ that generated the alert signal based on the verification signal(s) from the user. Such an exemplary feedback process may allow the systems of the present disclosure (e.g., system 100) to frequently adjust/optimize operation, such as by retraining a ML model (e.g., models $110c1$-$c4$) based upon user preferences/input.

In certain embodiments, the models $110c1$-$c4$, having received/retrieved the remediation action data, may further generate, by the one or more processors $110a$, recommended information for a remediation service; and/or initiate, by the one or more processors $110a$, contact between a user computing device (e.g., user computing device 120) and a remediation service computing device (e.g., remediation service computing device 140). For example, a user prompted by an alert signal to check the roof, may observe shingles are loose or have been damaged. The impact model $110c1$ may determine the user's need for a remediation service provider and may generate a recommended remediation action that includes a remediation service provider recommendation (e.g., a 24/7 emergency roofing service). The impact model $110c1$ may further initiate contact with the user and the recommended service provider by initiating contact between their respective devices (e.g., user computing device 120, remediation service computing device 140). Further, in some embodiments, the recommended remediation action signal may include any information to be sent to a remediation service provider and/or the remediation service provider computing device (e.g., remediation service provider computing device 140), such as an address of the user's structure, the alert signal (and/or information therein), an urgency indication of the hazardous and/or otherwise problematic condition, and/or any other suitable information or combinations thereof.

In some embodiments, the sensors generating the sensor data may be of any suitable organization proximate to the roofing structure (e.g., a sensor for each shingle, a sensor for every ten shingles, a sensor for every twenty shingles, etc.), and may be any suitable sensor type (e.g., impact sensor, sound sensor, vibration sensors, etc.). In these embodiments, the impact model $110c1$ may further aggregate signals from the plurality of sensors disposed proximate to the roofing structure to evaluate/determine the condition of the roofing structure. The roofing model $110c2$ may also analyze historical environmental data (e.g., sensor data of humidity, annual rainfall, temperature data) in conjunction with the sensor data to determine corresponding potentially chronic or long-term damage conditions to the roofing structure over a period of time.

As an example, the impact model $110c1$ may detect a status change of a roofing structure based upon a comparison between sensor data received from two different sets of sensors at different locations on the roof. Namely, the impact model $110c1$ may receive sensor data from sensors at a first location indicating a large impact at the first location, and the model $110c1$ may also receive sensor data from sensors at a second location indicating negligible impacts at the second location. The impact model $110c1$ may then determine the user's need for a remediation service provider to repair the potential damage to the first location of the roofing structure, and may generate the remediation service provider recommendation for a 24/7 emergency roofing service. In this example, the impact model $110c1$ may also output instructions for the one or more processors $110a$ to initiate contact with the user and the roofer by initiating contact between their respective devices (e.g., user computing device 120, remediation service computing device 140).

As previously discussed, in some embodiments, the central server 110 may generally train the one or more models $110c1$-$c4$ (e.g., ML models) to output alert signals, recommended remediation actions, environmental conditions, load on the roofing structure indications, leaking roofing structure indications, faulty sensor or sensor damage indications, recommended remediation action(s), remediation service provider recommendations, and/or evacuation recommendations. In particular, the training dataset may include (i) a plurality of training user data, (ii) a plurality of training sensor data, (iii) a plurality of training environmental data, (iv) a plurality of training contractor data, (v) a plurality of training geolocation data, (vi) a plurality of training recommended remediation data, and/or any other suitable training data or combinations thereof. Of course, in certain embodiments, any of the models $110c1$-$c4$ may be or include a rules-based algorithm configured to receive the illustrated input(s) and to output the illustrated output(s).

Exemplary Sensor Placement and Data Collection for a Roofing Structure

Figure 3A:
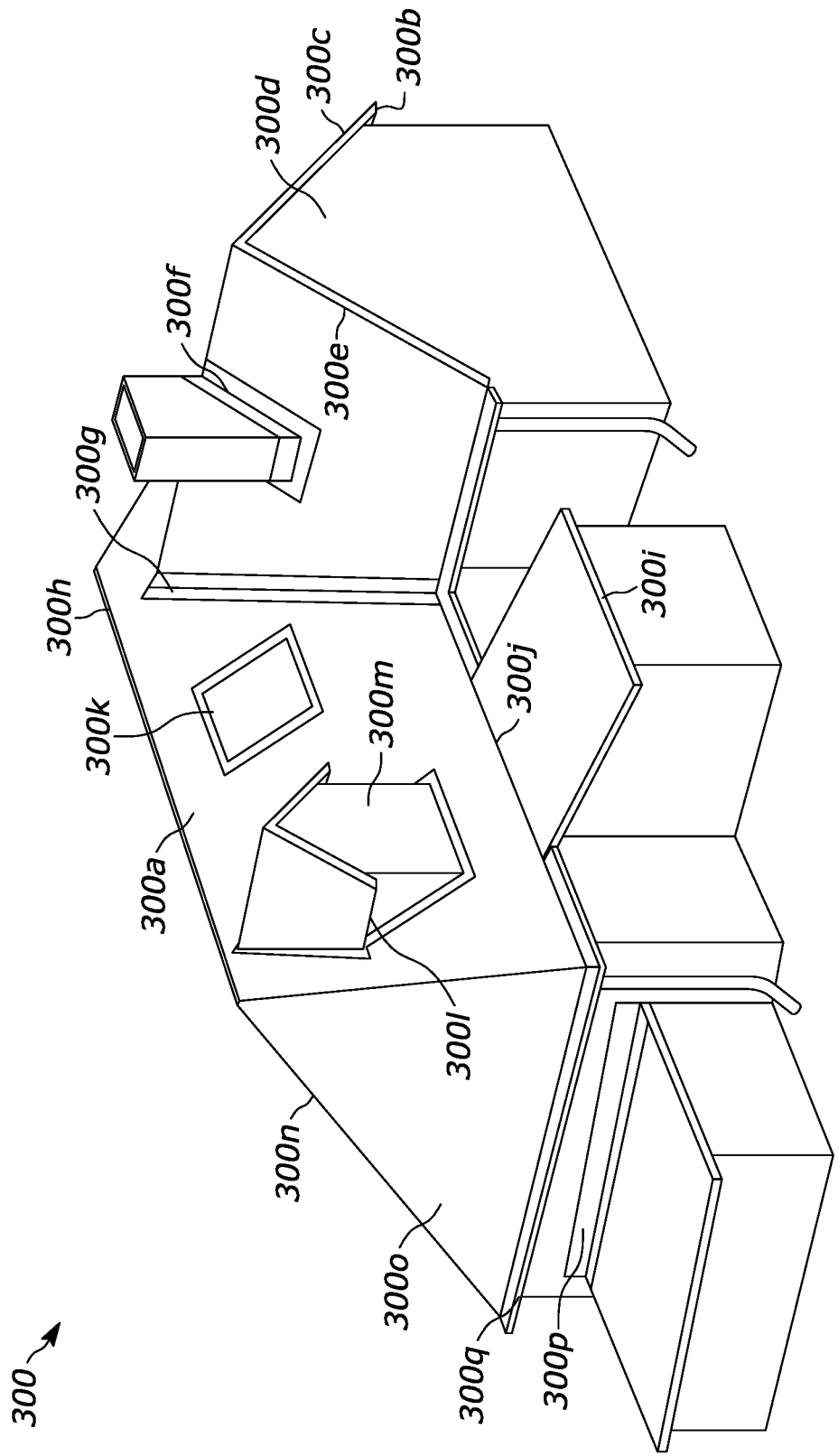
FIG. 3A depicts an exemplary external view of a typical home identifying exterior locations where sensors may be placed, in accordance with various embodiments described herein.

Generally speaking, a plurality of sensors can be installed and positioned on an exterior surface of a roofing structure, as depicted by an exterior surface of a roofing structure 300 shown in FIG. 3A. As shown in FIG. 3A, the exterior surface of the roofing structure 300 may include (i) roof shingles 300$a$, (ii) an eave 300$b$, (iii) a fascia 300$c$, (iv) a gable end 300$d$, (v) a rake 300$e$, (vi) a chimney flashing 300$f$, (vii) a valley 300$g$, (viii) a ridge 300$h$, (ix) a soffit 300$i$, (x) an abutment 300$j$, (xi) a drip edge 300$l$, (xii) a dormer edge 300$m$, (xiii) a hip 300$n$, (xiv) a hipped edge 300$o$, (xv) a flashing 300$p$, and/or (xvi) a rain gutter 300$q$. One or more sensors may be disposed proximate to any of these locations of the roofing structure 300, and/or at any other suitable location(s) of the roofing structure 300.

Figure 3B:
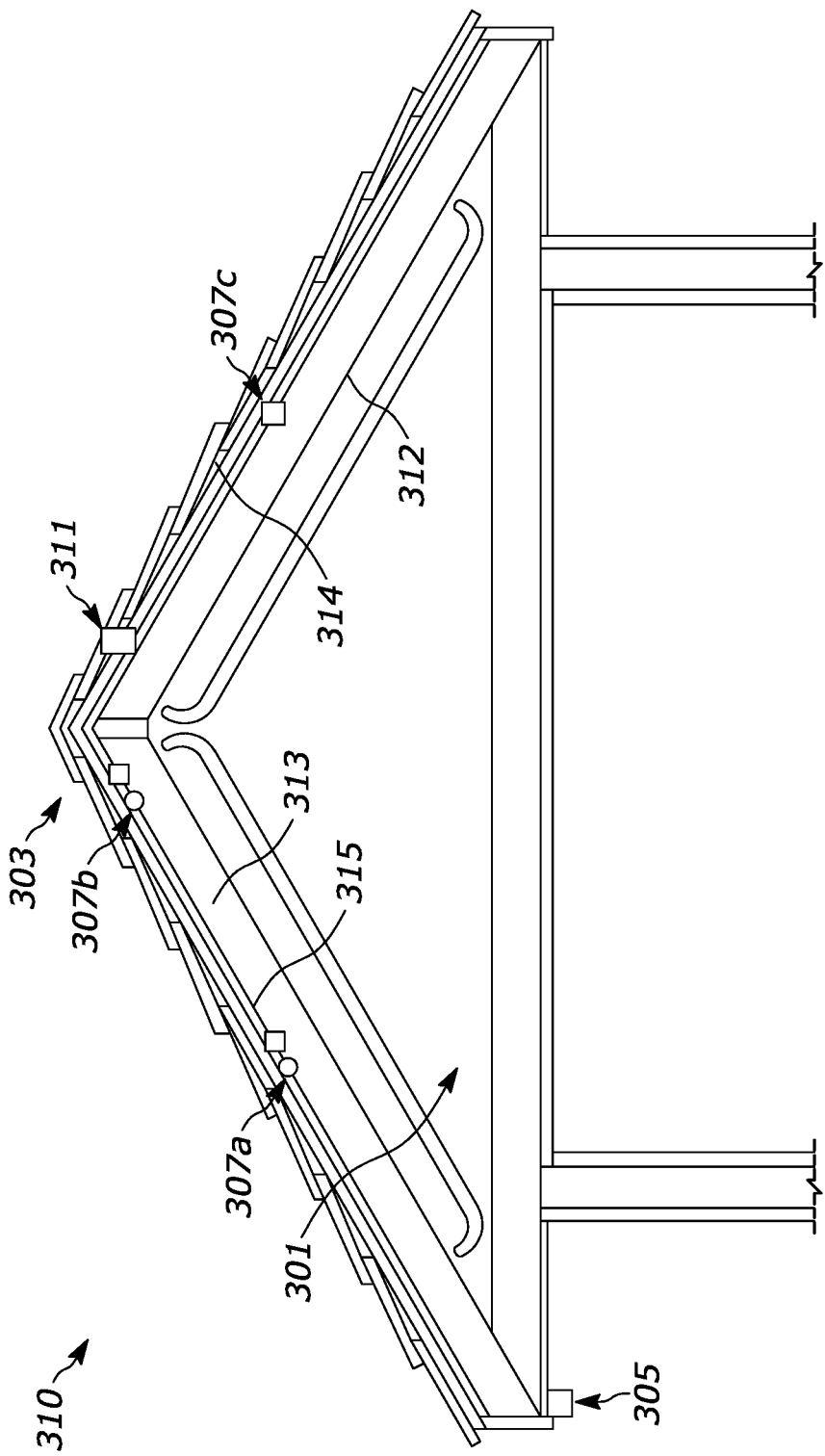
FIG. 3B depicts an exemplary cross-section of a roofing structure identifying locations where sensors may be placed, in accordance with various embodiments described herein.

More specifically, FIG. 3B depicts an exemplary cross-section of a roofing structure 310 including an interior area 301 of the roofing structure 310 and an exterior surface 303 of the roofing structure 310. A plurality of sensors can be positioned/installed within the interior area 301 of the roofing structure 310 and/or on the exterior surface 303 of the roofing structure 310. The interior area 301 of the roofing structure 310 may include (i) an attic ceiling 312, (ii) attic rafters 313, (iii) attic sheathing (not shown), (iv) rafter vents (not shown), (v) a bottom surface 314 of roof shingles, and/or (vi) an attic surface between the attic rafters 315. For example, as depicted in FIG. 3B, sensors 307a, 307b, and 307c are positioned proximate to the attic rafters 313.

By placing the sensors 307a-c within the interior area 301 of the roofing structure 310, for example, the sensors 307a-c may monitor humidity, temperature, and/or other observables to prevent rusting of exposed nails, rotting of the roof deck, and/or mold growing in the interior area 301 and/or on the bottom surface 314 of the roof shingles. For example, the sensors may monitor humidity, temperature, vibrations, sound, and/or other observables to detect deterioration to the roofing structure 310 due to dry rot. Such dry rot may generally be caused by fungi (e.g., *Serpula lacrymans, Coniophora puteana, Poria vaillantii*, etc.), and may be prevented as a result of the sensors 307a, 307b, and 307c monitoring for high moisture or humidity levels. When the humidity levels and/or current moisture levels exceed certain threshold values, the sensors 307a-c may generate sensor data indicating the excessive humidity levels and/or current moisture levels so that the models (e.g., models 110c1-c4) of the central server (e.g., central server 110) may generate alert signals indicating the potential for dry rot damage to the roofing structure 310.

Furthermore, sensors can be placed proximate to exterior surfaces 303, for example, a sensor 305 is positioned under a soffit, and a sensor 311 is positioned under a roof shingle. These exterior sensors may be positioned proximate to any suitable portion of the exterior surface 303. As an example, sensor 311 may be positioned under a solar panel that is covering one or more shingles. Moreover, a plurality of sensors may be installed in contact and/or otherwise proximate to the exterior surface 303 such that there is, for example, at least one sensor per shingle, at least one sensor per every ten shingles, at least one sensor per every twenty singles, and/or any other suitable combination of sensors at any suitable positions on the exterior surface 303. Placing one or more sensors (e.g., sensor 311) under and/or otherwise proximate to the shingles of the exterior surface 303 of the roofing structure may be particularly advantageous to monitor a plurality of environmental conditions, such as (i) precipitation, (ii) humidity, (iii) rain, (iv) snow, (v) sleet, (vi) hail, (vii) ice, (viii) wind, (ix) changes in temperature over a period of time, and/or any other suitable environmental conditions or combinations thereof.

In particular, potential damage to the roofing structure may be monitored and potentially averted due to the strategic placement of sensors on the roofing structure 310. For example, sensors 311 placed under a shingle can determine when moisture is trapped under shingle, which can cause the shingle to expand and the shingle surface to crack or break (termed "blistering"). As another example, sensors may be disposed proximate to valleys or ridges of a home (e.g., valley 300g, ridge 300h), where there is less sun exposure throughout the day. Excessive humidity or moisture accumulation over time, in addition to the relative lack of sun exposure, can lead to the growth of algae in these valleys and ridges, which may destroy limestone fillers and/or other components of the shingles over time. Thus, by monitoring humidity levels of the valleys or ridges over time, the models (e.g., models 110c1-c4) may analyze the sensor data generated by the sensors to warn the homeowner of potential algae (e.g., *Gloeocapsa magma*) growth on the exterior surface 303 of roofing structure 310.

Figure 3C:
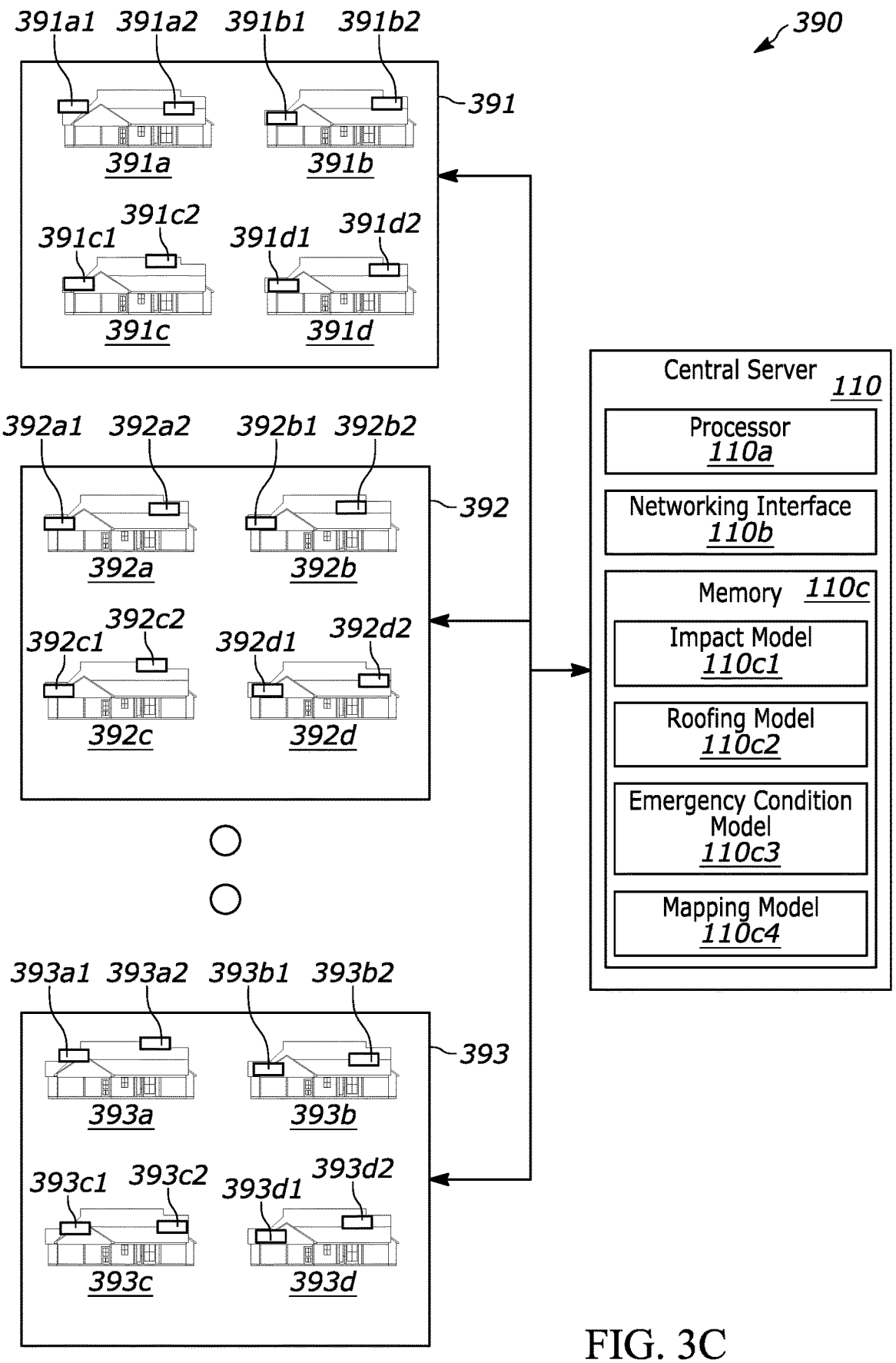
FIG. 3C illustrates another exemplary data collection implementation of a portion of the exemplary computing system of FIG. 1 with a plurality of structures in multiple regions to perform actions related to various embodiments of the present disclosure.

This monitoring and other sensor data evaluation may be locally performed, as well as crowdsourced through networked sensors and/or other monitoring devices. For example, FIG. 3C illustrates another exemplary data collection implementation 390 of a portion of the exemplary computing system 100 of FIG. 1 with a plurality of structures 391a-d, 392a-d, 393a-d in multiple regions 391, 392, 393 (also referenced herein as a "plurality of regions") to perform actions related to various embodiments of the present disclosure. In particular, the multiple regions 391, 392, 393 may represent regions within a country, a state, a province, a county, a parish, a city, a town, a neighborhood, etc., and/or a sub-region therein or any suitable area or combinations thereof. The structures 391a-d, 392a-d, 393a-d may represent any suitable number of structures that are located within the multiple regions 391, 392, 393. For example, the first region 391 may be or include a city, such that the structures 391a-d represent hundreds of thousands of structures. The second region 392 may be or include a town, such that the structures 392a-d represent tens of thousands of structures. The third region 393 may be or include a neighborhood, such that the structures 393a-d represent hundreds of structures.

Regardless, it should be appreciated that the multiple regions 391-393 may include any suitable number of regions that represent any suitable collections of structures 391a-d, 392a-d, 393a-d, and that the structures 391a-d, 392a-d, 393a-d may be or include any suitable number of structures. Moreover, each structure 391a-d, 392a-d, 393a-d may include a plurality of sensors 391a1, 391a2, 391b1, 391b2, 391c1, 391c2, 391d1, 391d2, 392a1, 392a2, 392b1, 392b2, 392c1, 392c2, 392d1, 392d2, 393a1, 393a2, 393b1, 393b2, 393c1, 393c2, 393d1, 393d2 (referenced herein collectively as "sensors 391a1-393d2"), and these sensors 391a1-393d2 may also include any suitable number of sensors disposed at any suitable location (e.g., exterior or interior to a roofing structure) with respect to the corresponding structure(s) 391a-d, 392a-d, 393a-d.

As illustrated in the exemplary data collection implementation 390 of FIG. 3C, the central server 110 may receive data from each region 391, 392, 393, and may generally communicate with those regions 391, 392, 393, for example, transmitting signals to devices in the structures 391a-d, 392a-d, 393a-d and/or to user computing devices (e.g., user computing device 120) of users that are associated with the structures 391a-d, 392a-d, 393a-d. In this manner, the central server 110 may aggregate data from the plurality of regions 391, 392, 393 to determine/generate values and/or maps/zones corresponding to the plurality of regions 391, 392, 393.

For example, at least one of the sensors 391a1-393d2 associated with each structure 391a-d, 392a-d, 393a-d may be or include a sensor configured to measure/detect data (e.g., the impact of hail) proximate to the associated structure 391a-d, 392a-d, 393a-d. In this example, the central server 110 may aggregate impact signals from each of the sensors that are configured to measure/detect impact data in each of the regions 391, 392, 393. The central server 110 may then create a regional map (e.g., via mapping model 110c4) that represents hail conditions in each region 391, 392, 393 for which the central server 110 receives impact/hail data. The central server 110 may then cause the regional impact map to be displayed to a user, as discussed further herein.

In another example, the plurality of sensors 391a1-393d2 associated with a plurality of structures 391a-393d in each region 391, 392, 393 could potentially provide information on potential future weather conditions, e.g., an approaching hurricane. The central server 110 may utilize the mapping model 110c4 with the plurality of sensors 391a1-393d2 in the individual regions 391, 392, 393 to monitor approaching weather conditions, for example, the direction an approaching hurricane is traveling from one region to another. In the event where the potential future weather condition is likely going to pass through the user's region, the central server 110 may also utilize the emergency condition model 110c3 to send an alert signal to warn the homeowner to evacuate the premises. In one embodiment, the plurality of sensors 391a1-393d2 may be impact sensors, where the impact sensors are configured to measure a load on the respective roofing structures of the plurality of structures 391a-393d. This may be particularly important in areas that receive large amounts of snowfall (e.g., Alaska, Minnesota, Pennsylvania, Vermont, Michigan, New Hampshire, Wyoming, Maine, etc.).

As another example, the central server 110 may also retrieve radar data representing weather conditions within each region 391, 392, 393 and/or any individual region 391, 392, 393, to determine a predicted regional humidity level at a first time in the future relative to the current time when the central server 110 retrieves the radar data. The central server 110 may then determine a predicted regional humidity level at the first time based upon the radar data and the humidity level signals from the plurality of sensors 391a1-393d2. For example, the radar data may indicate an approaching storm system, such that the central server 110 may utilize the mapping model 110c4 to predict potential hazardous environmental conditions in each region 391, 392, 393 based upon the radar data and the current humidity level in each region 391, 392, 393.

In this example, the current humidity level may be at a normal level for each region 391, 392, 393. Yet, as a storm system approaches, the central server 110 may generate a predicted humidity level corresponding to a decrease in the humidity level (e.g., corresponding to an onset of a cold-front thunderstorm) at the first time in the first region 391 that may be below the normal humidity level for the first region 391. The central server 110 may also generate a predicted humidity level at the first time in the second region 392 that may be decreasing at a greater rate (e.g., compared to region 391) that also may be below the normal humidity level for the second region 392. However, the central server 110 may generate a predicted humidity level at the first time in the third region 393 that may remain at the normal level for the third region 393 because the storm system may be predicted to miss the third region 393 entirely.

Accordingly, in the prior example, the central server 110 may then generate an alert signal indicating (i) the predicted humidity level caused by an approaching storm system at the first time for regions 391 and 392 in which a user's computing device (e.g., user computing device 120) is located, and (ii) a predicted mitigation action and/or remediation action the user may take to mitigate and/or thereafter remediate potential damaging effects from the predicted storm.

Exemplary Graphical User Interfaces (GUIs)

Figure 4:
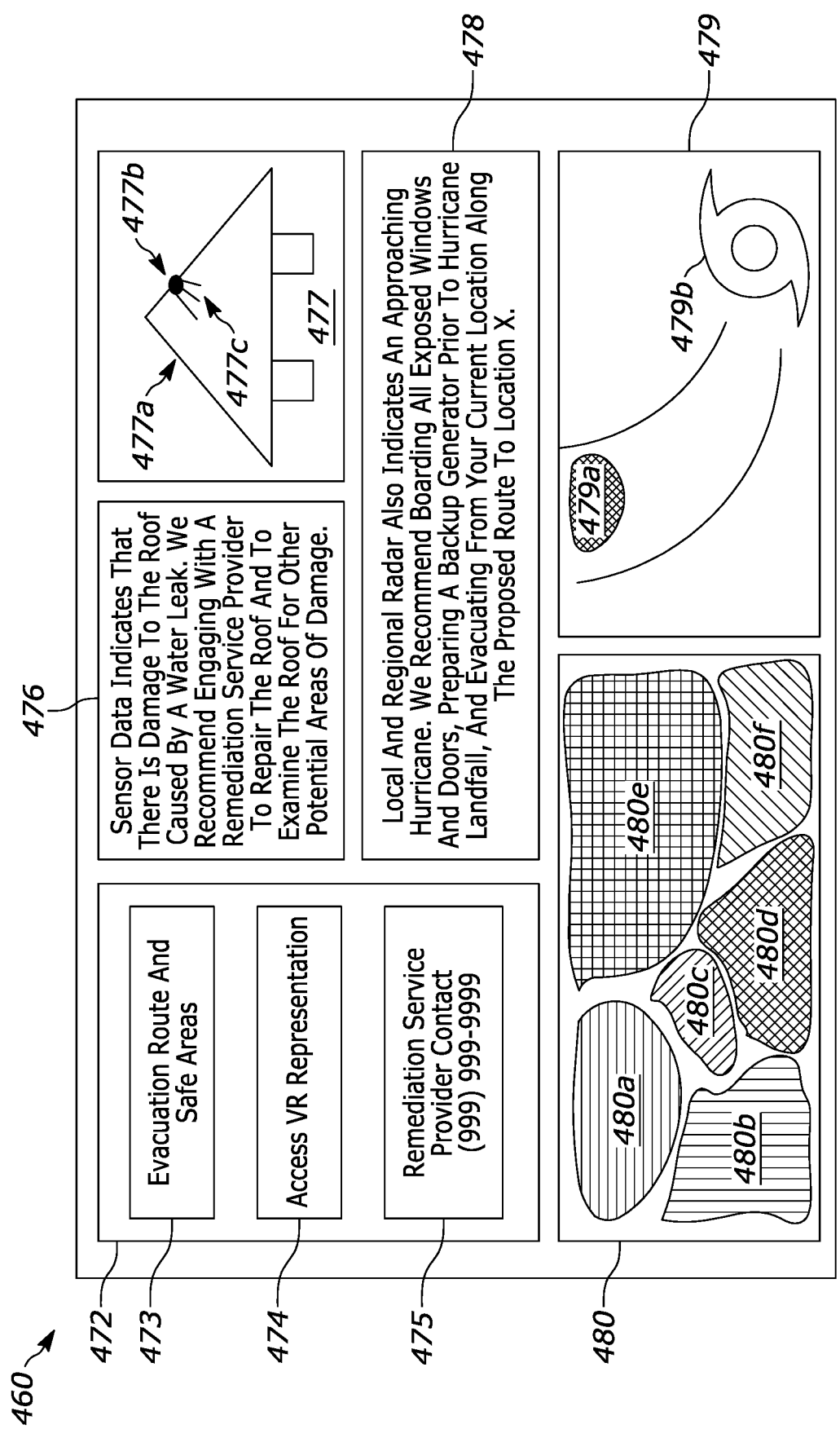
FIG. 4 depicts an exemplary graphical user interface (GUI) that may be displayed on a user computing device of FIG. 1, in accordance with various embodiments described herein.

FIG. 4 depicts an exemplary GUI 460 that may be displayed on a user computing device 120 of FIG. 1, in accordance with various embodiments described herein. Generally, the exemplary GUI 460 allows a user to interact with the central server 110, which may include receiving outputs from the central server 110 or sending inputs to the central server 110 as described in reference to the exemplary workflow 200 of FIG. 2. The exemplary GUI 460 thus provides the user with a designated place to remain informed regarding the functioning of a computing system configured to monitor devices and structures (e.g., exemplary computing system 100). In particular, the exemplary GUI 460 may display information, values, maps, contact information, and/or other data related to emergency conditions corresponding to a device and/or a structure.

Namely, the exemplary GUI 460 may include a first display hub 472, a remediation alert signal hub 476, a damage condition hub 477, an evacuation recommendation hub 478, a catastrophic event hub 479, and a regional catastrophic event hub 480. The first display hub 472 may include an evacuation route and safe area button 473, an interactive VR representation button 474, and remediation service provider contact information 475. The user may directly interact (e.g., click, swipe, tap, gesture, voice command, etc.) with the evacuation route and safe area button 473, the interactive VR representation button 474, and the remediation service provider contact information 475 to initiate additional actions that may direct the user away from the exemplary GUI 460.

For example, interacting with the evacuation route and safe area button 473 may cause the user computing device 120 to render and/or otherwise display one or more proposed evacuation routes or safe areas on the display for viewing by the user. For example, the user may interact with the evacuation route and safe area button 473, and the user computing device 120 may exit and/or close the third exemplary GUI 460 and open a mapping application or other application that may display proposed evacuation routes from the user's current location or the location of the structure/device to a safe area (e.g., managed by an entity as free shelter from the catastrophic event).

Interacting with the interactive VR representation button 474 may cause the user computing device 120 to instruct the user to prepare a VR headset (not shown), and the user computing device 120 may then render and/or otherwise cause the user to view a representation of the catastrophic event and/or a representation of the user's associated structure and/or device when the catastrophic event reaches the structure and/or device. Additionally, or alternatively, interacting with the interactive VR representation button 474 may cause the user computing device 120 to render a virtual representation of the user's roofing structure the, so that the user may view any damage to the roofing structure.

In any event, the user may view the VR environment, and the user computing device 120 may render a representation of the roofing damage condition and/or the catastrophic event in the VR environment by replicating predicted rainfall, wind gusts, and/or other effects of the catastrophic event in the VR environment for viewing by the user. For example, the user may view the VR environment, and the user computing device 120 may cause a representation of the effects of hurricane force winds on the structure and/or the device to be displayed to the user in the VR environment. Additionally, or alternatively, the user computing device 120 may render all or a portion of the evacuation routes in the VR environment for display to the user, so that the user may determine potential traffic conditions, etc.

Additionally, interacting with the remediation service provider contact information 475 may cause the user computing device 120 to initiate a communication (e.g., phone call) between the user and the device maintenance provider (e.g., via remediation service provider computing device 140). In other words, when the user interacts with the remediation service provider contact information 475, the user computing device 120 may open and/or otherwise activate a phone calling application or function, dial the number (e.g., (999) 999-999 in FIG. 4) associated with the remediation service provider, and thereby enable the user to communicate directly with an employee or other representative of the remediation service provider. Of course, as previously mentioned, such communication initiated by the user computing device 120 may be or include, without limitation, a phone call, a web chat, an email, a text message, and/or any other suitable communication medium or combinations thereof.

Each of the remediation alert signal hub 476, the damage condition hub 477, and the evacuation recommendation hub 478 may provide instructions, values, representations, recommendations, and/or other indications to a user related to data processed by the central server 110. For example, the remediation alert signal hub 476 states that "[s]ensor data indicates that there is damage to the roof caused by a water leak. We recommend engaging with a remediation service provider to repair the roof and to examine the roof for other potential areas of damage." The user may view this remediation alert signal in the remediation alert signal hub 476, and the user may check the roof (e.g., visually look for damage or enter the attic space) to ensure that there is no leak, and if there is one to contact a remediation service provider (e.g., via remediation service provider contact information 475) to receive remediation services corresponding to roof damage.

As another example, and as illustrated in FIG. 4C, the damage condition hub 477 may illustrate the roofing structure damage condition described in the remediation alert signal hub 476. The damage condition hub 477 may generally illustrate the shape of the user's roofing structure, and may indicate locations on the roofing structure corresponding to the roofing damage condition based on the sensor locations disposed proximate to the roofing structure. Namely, the damage condition hub 477 may include a rendering of the roofing structure, that has an exterior surface 477a, a damage point 477b on the exterior surface 477a, and a water leak indication 477c.

As yet another example, the evacuation recommendation hub 478 states that "[l]ocal and regional radar also indicates an approaching hurricane. We recommend boarding all exposed windows and doors, preparing a backup generator prior to hurricane landfall, and evacuating from your current location along the proposed route to location X." The user may view these recommended damage mitigation actions in the evacuation recommendation hub 478, and the user may begin making preparations in advance of the catastrophic event (e.g., hurricane) to mitigate the potential damaging effects of the catastrophic event on the user' structure and/or devices. The user may also view this proposed evacuation recommendation in the evacuation recommendation hub 478, and the user may determine whether or not to evacuate from the location of the structure. More specifically, the user may consider evacuating to the specific location (e.g., "location X") mentioned in the evacuation recommendation hub 478, and the user may interact with the evacuation recommendation hub 478 and/or the evacuation route and safe area button 473 to receive recommended evacuation routes and/or safe areas where the user may desire to evacuate to avoid damaging effects from the catastrophic event.

The catastrophic event hub 479 may generally indicate a large-scale view of an approaching and/or otherwise proximate catastrophic event relative to a structure/device. In particular, the catastrophic event hub 479 may include a region 479a that is predicted to be within the path of a catastrophic event 479b (e.g., a hurricane). From this catastrophic event hub 479, the user may view updates to path information of the catastrophic event 479b, and may continue to monitor the progress of the catastrophic event 479b as it approaches and/or otherwise moves relative to the user's region 479a.

The regional catastrophic event hub 480 may generally represent predicted effects of a catastrophic event 479b on structure and/or devices in the various regions 480a-f, at least one of which, may include the structure corresponding to the user accessing the exemplary GUI 460. The area represented in the regional catastrophic event hub 480 may generally correspond to the region 479a from the catastrophic event hub 479, but the area may also include more or fewer landmasses or other areas than the region 479a. The central server 110 may have aggregated sensor data from a plurality of sensors disposed proximate to multiple roofing structures in the region 479a, and the central server 110 may generate the catastrophic event map displayed in the regional catastrophic event hub 480.

For example, the catastrophic event map displayed in the regional catastrophic event hub 480 may include a plurality of regions 480a-f that may each have a different corresponding level/value, such as an emergency condition likelihood value based upon estimated/predicted damaging effects from the catastrophic event, e.g., hurricane 479b. The first region 480a may have a level/value (e.g., representative of rainfall levels and/or wind levels from the hurricane 479b) that is relatively low, the second region 480b may have a level/value that is relatively average, the third region 480c may have a level/value that is relatively high, the fourth region 480d may have a level/value that is relatively high, the fifth region 480e may have a level/value that is relatively average, and the sixth region 480f may have a level/value that is relatively low.

Of course, it should be understood that the levels/values in the various regions 480a-f may be any suitable value, such as the emergency condition likelihood value, an evacuation likelihood value, an overall cost value from damage of the catastrophic event, an average evacuation distance value, and/or any other suitable value(s) or combinations thereof. Further, the catastrophic event map displayed in the regional catastrophic event hub 480 may include any suitable number of regions 480a-f that have any suitable shapes.

Moreover, it should be understood that any sensor data, user data, environmental data, contractor data, geolocation data, remediation action data, and/or any values determined, detected, calculated, and/or otherwise output by the central server 110 may be displayed generally in the GUI 460. Additionally, or alternatively, it should be appreciated that interaction with the hubs or displays in the GUI 460 may cause the user computing device 120 and/or the central server 110 to perform other actions than those described in reference to FIG. 4. For example, a user interacting with the remediation alert signal hub 476 of FIG. 4 may cause the user computing device 120 to transmit a recommended remediation action signal (shown in FIG. 2) to a remediation provider, which provides the address of the structure and states "[s]ensor data indicates there is damage to the roof caused by a water leak". Of course, this example is for illustration purposes only, and other actions/signals described herein may be transmitted, relayed, and/or otherwise performed by the user computing device 120 and/or the central server 110 in response to the user interacting with any hub or display within the GUI 460.

Exemplary Virtual Representations of Structures and Devices

Figure 5:
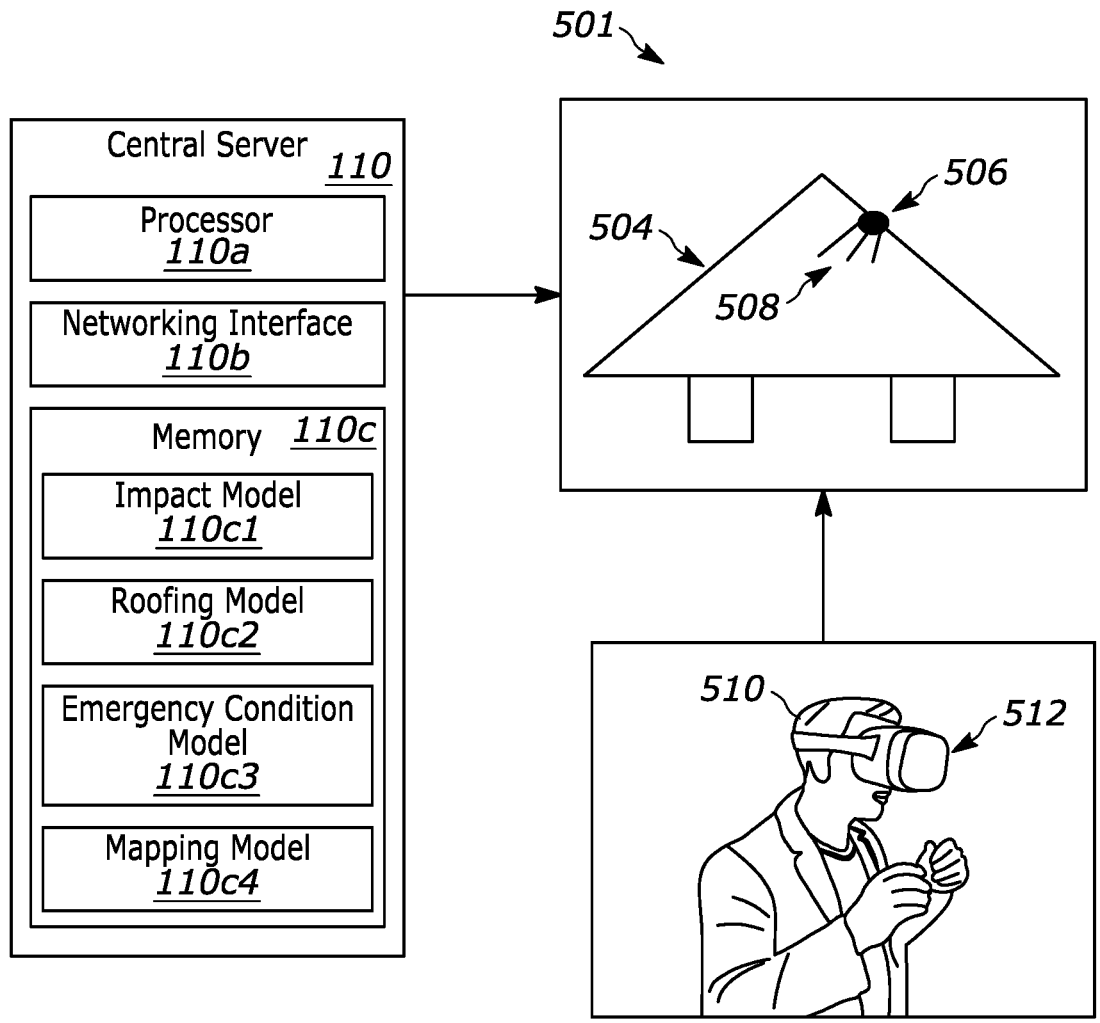
FIG. 5 depicts an exemplary generation of a virtual representation of a condition, such as a roofing damage condition, for viewing by a user in a virtual environment, and in accordance with various embodiments described herein.

As previously mentioned, a user may view virtual representations of various structures, devices, and/or alerts, recommendations, and/or other calculated values determined by the central server 110. FIG. 5 depicts an exemplary generation and viewing sequence 500 of a virtual representation of a condition, such as a roofing damage condition, for viewing by a user 510 in a virtual environment 501, and in accordance with various embodiments described herein. In particular, the virtual representation may be a virtual reality (VR) representation (e.g., a virtual, 3D model) of a roofing structure 504 of a user's structure. However, it should be understood that the virtual representation may be a virtual, 3D model of the user's structure and/or any portion thereof, and/or any devices corresponding to the structure.

In particular, FIG. 5 depicts the central server 110 generating the virtual representation that is displayed in the virtual environment 501. The central server 110 may generate the virtual representation by utilizing any of sensor data, user data, radar data, environmental data, contractor data, geolocation data, 3D scan data, and/or other suitable data to generate the VR representation of the roofing structure 504. For example, the central server 110 may utilize sensor data from one or more sensors disposed in the real-world attic of the user's structure to generate an approximate replication of the roofing structure 504 in the virtual environment 501. The central server 110 may also utilize humidity level signal data, a detected emergency condition, and/or other suitable data or values to replicate an emergency condition within the roofing structure 504 of the user's structure in the virtual environment 501.

As illustrated in FIG. 5, the user 510 may utilize a VR headset 512 to view the virtual environment 501, which may be hosted as part of a VR platform, such as the Metaverse. In the exemplary generation and viewing sequence 500, the user 510 may have recently received an alert signal indicating that the roofing structure is damaged and water is leaking into the attic. The user 510 may then interact with an option or button (e.g., interactive VR representation button, not shown) configured to enable the user to view the virtual environment 501, and as a result, the user 510 may view the virtual environment 501 through the VR headset 512.

A VR platform (e.g., Metaverse) hosting server (not shown) and/or other suitable device may receive the virtual representation from the central server 110 and may proceed to render the virtual representation within the virtual environment 501. The user 510 may have a virtual model of the user's structure stored in the VR platform, and the VR platform may update the virtual model such that the virtual representation of the roofing structure 504 includes a sensor 506 proximate to a damage representation 508 (e.g., water leakage). In this manner, the user 510 may access the VR platform through the VR headset 512 and may view the damage representation 508 on the virtual representation of the roofing structure 504. As part of this virtual environment 501, the VR platform and/or the central server 110 may render one or more sensors 506 in the virtual representation of the roofing structure 504 so that the user 510 may visualize where the data originated from, and an approximation of the emergency condition in the actual roof.

If the user contacts a remediation service provider, the virtual representation of the roofing structure 504 may update/change to reflect the remediation services. Namely, as the remediation progresses, the remediation provider may input/upload remediation data into the central server 110 that indicates an updated/repaired state of the roof. The VR platform hosting server and/or other suitable device may access the central server 110 by, for example, providing authorizing credentials corresponding to the user 510, and may retrieve the remediation data corresponding to the completed maintenance of the roof.

The VR platform hosting server and/or other suitable device may thereby retrieve the remediation data from the central server 110 and/or a remediation service provider computing device 140 and may interpret the remediation data to determine if or how to update the virtual representation of the roofing structure 504 based upon the remediation data. For example, the VR platform hosting server may determine that the damage to the roof is repaired based upon the remediation data, and may update the virtual representation of the roofing structure 504 by including a repaired portion (not shown) as part of the virtual representation of the roofing structure 504 that was previously indicated by the sensor 506. Similarly, the VR platform hosting server may remove the damage representation 508 from the virtual representation of the roofing structure 504 to indicate that the water leakage to the roof has been eliminated. Therefore, the user 510 may access the VR platform through the VR headset 512 and may view the repaired/updated portions as part of the virtual representation of the roofing structure 504 when the remediation is completed and the remediation data is stored/uploaded to the central server 110 and/or the remediation service provider computing device 140, thereby documenting the completed remediation.

Of course, the virtual environment 501 represented in FIG. 5 is a single embodiment that is for the purposes of discussion only. As such, it should be appreciated that the virtual environment may be or include a VR representation of any suitable portion of the user's structure, a device associated with the structure, and/or any other data or values measured, calculated, and/or otherwise generated in relation to the structure.

Exemplary Computer-Implemented Method

Figure 6:
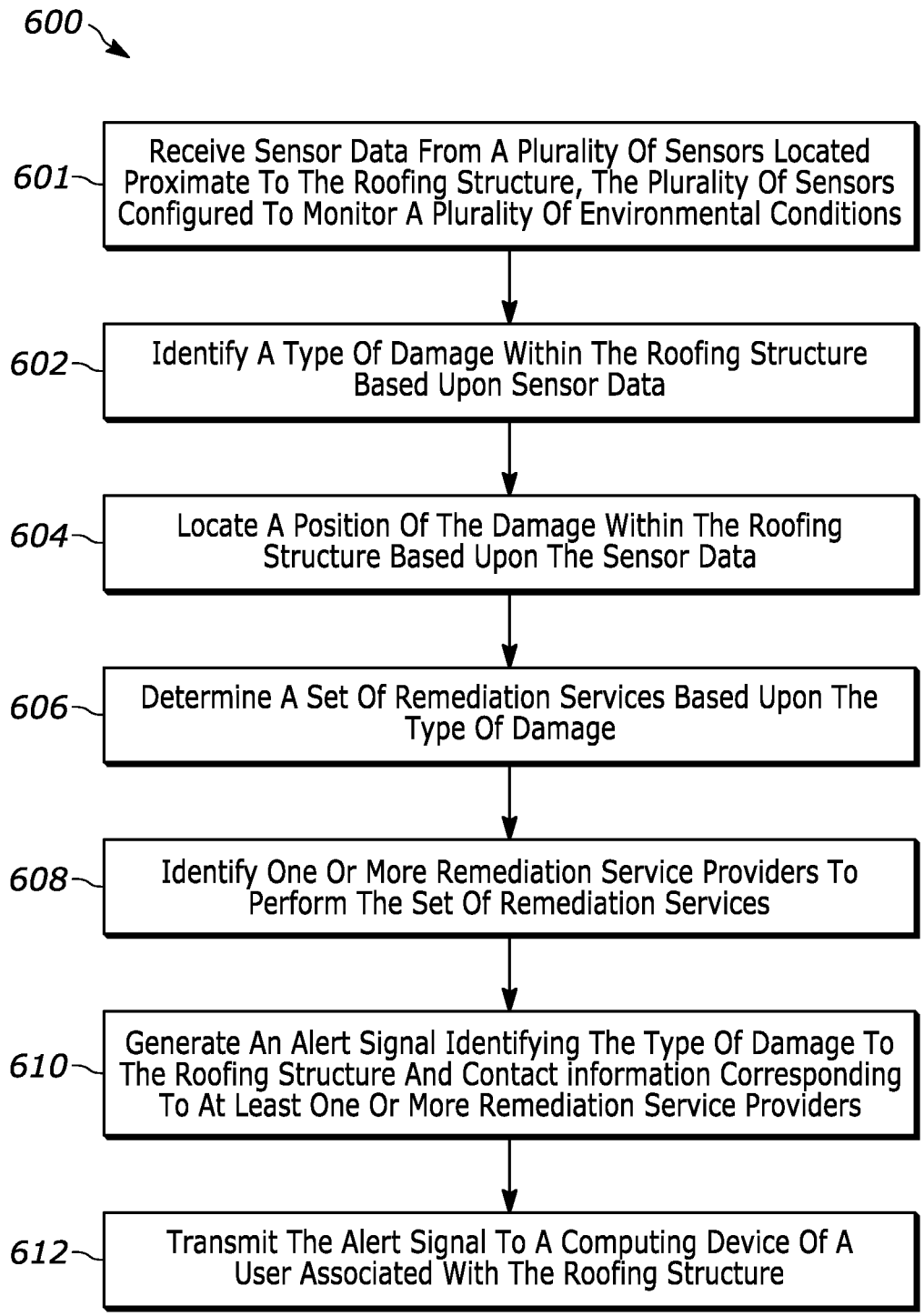
FIG. 6 depicts a first flow diagram representing an exemplary computer-implemented method, in accordance with various embodiments described herein.

FIG. 6 depicts a first flow diagram representing an exemplary computer-implemented method 600, in accordance with various embodiments described herein. The method 600 may be implemented by one or more processors of the exemplary computing system 100, such as the central server 110, the workstation 111, the user computing device 120, the sensor device 130, the remediation service provider computing device 140, the external server 150, and/or any other suitable components described herein or combinations thereof.

The method 600 may include receiving sensor data from a plurality of sensors located proximate to the roofing structure, the plurality of sensors being configured to monitor a plurality of environmental conditions (block 601). The method 600 may also include identifying, by one or more processors, a type of damage within the roofing structure based upon sensor data (block 602). The method 600 may further include locating, by one or more processors, a position of the damage within the roofing structure based upon the sensor data (block 604). The method 600 may further include determining, by one or more processors, a set of remediation services based upon the type of damage (block 606).

Moreover, the method 600 may include identifying, by one or more processors, one or more remediation service providers to perform the set of remediation services (block 608). Additionally, the method 600 may include generating, by one or more processors, an alert signal identifying the type of damage to the roofing structure and contact information corresponding to at least one or more remediation service providers (block 610). The method 600 may further include transmitting, by one or more processors, the alert signal to a computing device of a user associated with the roofing structure (block 612).

In some embodiments, the method 600 may further include identifying at least one of the plurality of environmental conditions based upon the sensor data. The plurality of environmental conditions may include at least one of: (i) precipitation, (ii) humidity, (iii) rain, (iv) snow, (v) sleet, (vi) hail, (vii) ice, (viii) wind, and/or (ix) changes in temperature over a period of time.

In certain embodiments, the method 600 may further include identifying a set of environmentally dangerous conditions based upon the sensor data and generating an evacuation recommendation based upon the set of environmentally dangerous conditions. Further in these embodiments, the method 600 may further include transmitting the evacuation recommendation to the computing device of the user associated with the roofing structure.

In some embodiments, the plurality of sensors may be installed in contact with at least one of: (i) an exterior surface of the roofing structure or (ii) an internal surface of the roofing structure. The exterior surface of the roofing structure may include: (i) roof shingles, (ii) an eave, (iii) a fascia, (iv) a gable end, (v) a rake, (vi) a chimney flashing, (vii) a valley, (viii) a ridge, (ix) a soffit, (x) an abutment, (xi) a drip edge, (xii) a dormer edge, (xiii) a hip, (xiv) a hipped edge, (xv) a flashing, and/or (xvi) a rain gutter. Further, the plurality of sensors may be installed in contact with the exterior surface of the roofing structure such that there is at least one sensor per shingle, at least one sensor per every ten shingles, and/or at least one sensor per every twenty shingles.

Moreover, in certain embodiments, the internal surface of the roofing structure may be or include: (i) an attic ceiling, (ii) attic rafters, (iii) attic sheathing, (iv) rafter vents, (v) a bottom surface of roof shingles, and/or (vi) an attic surface between the attic rafters. In some embodiments, the plurality of sensors may be impact sensors, and the impact sensors may be configured to measure a load on the roofing structure.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed is:

1. A computer system for detecting damage to a roofing structure and initiating remediation procedures, comprising:
   one or more processors; and
   a non-transitory computer-readable memory coupled to the one or more processors, the memory storing instructions thereon that, when executed by the one or more processors, cause the one or more processors to:
      receive sensor data from a plurality of sensors located proximate to the roofing structure, the plurality of sensors being configured to monitor a plurality of environmental conditions,
      identify a type of damage within the roofing structure based upon the sensor data,
      locate a position of the damage within the roofing structure based upon the sensor data,
      determine a set of remediation services based upon the type of damage,
      identify one or more remediation service providers to perform the set of remediation services,
      generate an alert signal identifying the type of damage to the roofing structure and contact information corresponding to at least one of the one or more remediation service providers, and transmit the alert signal to a computing device of a user associated with the roofing structure.

2. The computer system of claim 1, wherein the instructions, when executed, further cause the one or more processors to:

identify at least one of the plurality of environmental conditions based upon the sensor data, the plurality of environmental conditions comprising at least one of: (i) precipitation, (ii) humidity, (iii) rain, (iv) snow, (v) sleet, (vi) hail, (vii) ice, (viii) wind, or (ix) changes in temperature over a period of time.

3. The computer system of claim 1, wherein the instructions, when executed, further cause the one or more processors to:

identify a set of environmentally dangerous conditions based upon the sensor data;

generate an evacuation recommendation based upon the set of environmentally dangerous conditions; and transmit the evacuation recommendation to the computing device of the user associated with the roofing structure.

4. The computer system of claim 1, wherein the plurality of sensors are installed in contact with at least one of: (i) an exterior surface of the roofing structure or (ii) an internal surface of the roofing structure.

5. The computer system of claim 4, wherein the exterior surface of the roofing structure comprises: (i) roof shingles, (ii) an eave, (iii) a fascia, (iv) a gable end, (v) a rake, (vi) a chimney flashing, (vii) a valley, (viii) a ridge, (ix) a soffit, (x) an abutment, (xi) a drip edge, (xii) a dormer edge, (xiii) a hip, (xiv) a hipped edge, (xv) a flashing, or (xvi) a rain gutter.

6. The computer system of claim 4, wherein the plurality of sensors are installed in contact with the exterior surface of the roofing structure such that there is at least one sensor per shingle, at least one sensor per every ten shingles, or at least one sensor per every twenty shingles.

7. The computer system of claim 4, wherein the internal surface of the roofing structure comprises: (i) an attic ceiling, (ii) attic rafters, (iii) attic sheathing, (iv) rafter vents, (v) a bottom surface of roof shingles, or (vi) an attic surface between the attic rafters.

8. The computer system of claim 1, wherein the plurality of sensors are impact sensors, wherein the impact sensors are configured to measure a load on the roofing structure.

9. A computer-implemented method for detecting damage to a roofing structure and initiating remediation procedures, the method comprising:

receiving sensor data from a plurality of sensors located proximate to the roofing structure, the plurality of sensors being configured to monitor a plurality of environmental conditions;

identifying, by one or more processors, a type of damage within the roofing structure based upon the sensor data;

locating, by one or more processors, a position of the damage within the roofing structure based upon the sensor data;

determining, by one or more processors, a set of remediation services based upon the type of damage;

identifying, by one or more processors, one or more remediation service providers to perform the set of remediation services;

generating, by one or more processors, an alert signal identifying the type of damage to the roofing structure and contact information corresponding to at least one or more remediation service providers; and transmitting, by one or more processors, the alert signal to a computing device of a user associated with the roofing structure.

10. The computer-implemented method of claim 9, further comprising:

identifying at least one of the plurality of environmental conditions based upon the sensor data, the plurality of environmental conditions comprising at least one of: (i) precipitation, (ii) humidity, (iii) rain, (iv) snow, (v) sleet, (vi) hail, (vii) ice, (viii) wind, or (ix) changes in temperature over a period of time.

11. The computer-implemented method of claim 9, further comprising:

identifying a set of environmentally dangerous conditions based upon the sensor data;

generating an evacuation recommendation based upon the set of environmentally dangerous conditions; and transmitting the evacuation recommendation to the computing device of the user associated with the roofing structure.

12. The computer-implemented method of claim 9, wherein the plurality of sensors are installed in contact with at least one of: (i) an exterior surface of the roofing structure or (ii) an internal surface of the roofing structure.

13. The computer-implemented method of claim 12, wherein the exterior surface of the roofing structure comprises: (i) roof shingles, (ii) an eave, (iii) a fascia, (iv) a gable end, (v) a rake, (vi) a chimney flashing, (vii) a valley, (viii) a ridge, (ix) a soffit, (x) an abutment, (xi) a drip edge, (xii) a dormer edge, (xiii) a hip, (xiv) a hipped edge, (xv) a flashing, or (xvi) a rain gutter.

14. The computer-implemented method of claim 13, wherein the plurality of sensors are installed in contact with the exterior surface of the roofing structure such that there is at least one sensor per shingle, at least one sensor per every ten shingles, at least one sensor per every twenty shingles.

15. The computer-implemented method of claim 12, wherein the internal surface of the roofing structure comprises: (i) an attic ceiling, (ii) attic rafters, (iii) attic sheathing, (iv) rafter vents, (v) a bottom surface of roof shingles, or (vi) an attic surface between the attic rafters.

16. The computer-implemented method of claim 9, wherein the plurality of sensors are impact sensors, wherein the impact sensors are configured to measure a load on the roofing structure.

17. A non-transitory machine-readable medium comprising instructions for detecting emergency conditions within roofing structures and initiating remediation procedures that, when executed, cause a machine to at least:

detect an emergency condition based upon sensor data from at least one sensor associated with a roofing structure;

determine a set of remediation services corresponding to the roofing structure based upon the emergency condition;

identify one or more remediation service providers to perform the set of remediation services to the roofing structure;

generate a remediation alert signal that includes contact information corresponding to at least one of the one or more remediation service providers; and transmit the remediation alert signal to a user computing device of a user associated with the roofing structure.

18. The non-transitory machine-readable medium of claim 17, wherein the instructions, when executed further cause the one or more processors to:

determine the set of remediation services by determining a remediation action based upon the emergency condition, the remediation action being associated with sensor data from at least one sensor associated with the roofing structure.

19. The non-transitory machine-readable medium of claim 17, wherein the instructions, when executed further cause the one or more processors to:

prior to detecting the emergency condition, detect a catastrophic event approaching the structure;

aggregate signal data from a plurality of sensors in a plurality of structures within a region including the structure;

determine an evacuation value associated with the region based upon the signal data from the plurality of devices;

generate an evacuation recommendation based upon the evacuation value, wherein the evacuation recommendation includes one or more recommended evacuation routes and one or more safe areas; and cause the evacuation recommendation to be displayed to the user.

20. The non-transitory machine-readable medium of claim 17, wherein the instructions, when executed further cause the one or more processors to be responsive to identifying at least one of a plurality of environmental conditions based upon the sensor data, the plurality of environmental conditions comprising at least one of: (i) precipitation, (ii) humidity, (iii) rain, (iv) snow, (v) sleet, (vi) hail, (vii) ice, (viii) wind, or (ix) changes in temperature over a period of time.

* * * * *